(12) United States Patent
Ashikawa et al.

(10) Patent No.: US 6,855,285 B2
(45) Date of Patent: Feb. 15, 2005

(54) MAGNETIC TAPE CASSETTE

(75) Inventors: Teruo Ashikawa, Kanagawa (JP); Hiroyuki Naito, Kanagawa (JP); Kiyoo Morita, Kanagawa (JP); Shozo Onmori, Kanagawa (JP); Katsuki Asano, Kanagawa (JP); Masayoshi Moriwaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/681,113

(22) Filed: Oct. 9, 2003

(65) Prior Publication Data

US 2004/0080081 A1 Apr. 29, 2004

Related U.S. Application Data

(62) Division of application No. 10/327,063, filed on Dec. 24, 2002, which is a division of application No. 09/833,671, filed on Apr. 13, 2001, now Pat. No. 6,643,096.

(30) Foreign Application Priority Data

Apr. 14, 2000 (JP) .................................... P. 2000-113829

(51) Int. Cl.[7] .................. B29C 59/04; B29C 71/02; G11B 23/03; G11B 23/087
(52) U.S. Cl. .................. 264/320; 264/345; 360/132; 360/130.33
(58) Field of Search .................. 264/293, 299, 264/319, 320, 345, 331.11, 340; 360/132, 130.2, 130.21, 130.32, 130.33

(56) References Cited

U.S. PATENT DOCUMENTS

| | | | |
|---|---|---|---|
| 4,276,575 A | 6/1981 | Schoettle et al. | |
| 4,466,582 A | 8/1984 | Shiba | |
| 4,640,473 A | 2/1987 | Aoyama | |
| 4,863,116 A | 9/1989 | Iizuka et al. | |
| 4,930,032 A | 5/1990 | Miyoshi et al. | |
| 4,949,210 A | 8/1990 | Satoh et al. | |
| 5,216,563 A | 6/1993 | Lee | |
| 5,326,048 A | 7/1994 | Kim | |
| 5,690,292 A | 11/1997 | Sano | |
| 6,057,992 A | * 5/2000 | Kikuchi | 360/132 |

FOREIGN PATENT DOCUMENTS

| | | |
|---|---|---|
| DE | 3739093 A1 | 3/1989 |
| EP | 372681 A1 | 6/1990 |
| EP | 422658 A2 | 4/1991 |
| JP | 58-118069 A | 7/1983 |
| JP | 58-137172 A | 8/1983 |
| JP | 61-66276 A | 4/1986 |
| JP | 61-77178 A | 4/1986 |
| JP | 63-217558 A | 9/1988 |
| JP | 1-298587 A | 12/1989 |

(List continued on next page.)

*Primary Examiner*—William J. Klimowicz
(74) *Attorney, Agent, or Firm*—Sughrue Mion, PLLC

(57) ABSTRACT

In a magnetic tape cassette, a top end portion of a reel urging plate spring for urging a tape reel is subjected to a surface treatment to prevent from a friction. A distance between a couple of flanges of the tape reel is selected to keep a form of the wound magnetic tape, and to prevent the tape running from being disturbed by the increases of a contract resistance of the tape edges to the flanges. Additionally, positioning portions for positioning the magnetic tape cassette relative to a magnetic tape drive device are formed of a differential resin from the resin of the remaining part of the cassette case. Additionally, at least one of both end faces of each guide roller is surface treated so that the end face is not worn through its contact with the cassette half. Further, an information presenting section for displaying variable information is provided at a location other than label areas of the tape cassette.

4 Claims, 17 Drawing Sheets

FOREIGN PATENT DOCUMENTS

| | | | | |
|---|---|---|---|---|
| JP | 02023582 A | * | 1/1990 | ......... G11B/23/113 |
| JP | 3-24926 A | | 2/1991 | |
| JP | 4-92278 A | | 3/1992 | |
| JP | 5-47153 A | | 2/1993 | |
| JP | 5-128798 A | | 5/1993 | |
| JP | 05128798 A | * | 5/1993 | ......... G11B/23/087 |
| JP | 5-298854 A | | 11/1993 | |
| JP | 5-307862 A | | 11/1993 | |
| JP | 8-87859 A | | 4/1996 | |
| JP | 08087859 A | * | 4/1996 | ......... G11B/23/087 |
| JP | 9-245455 A | | 9/1997 | |
| JP | 9-270179 A | | 10/1997 | |
| JP | 10-106219 A | | 4/1998 | |
| JP | 11086494 A | * | 3/1999 | ......... G11B/23/087 |
| JP | 11-232821 A | | 8/1999 | |
| JP | 2001-357653 A | | 12/2001 | |

* cited by examiner

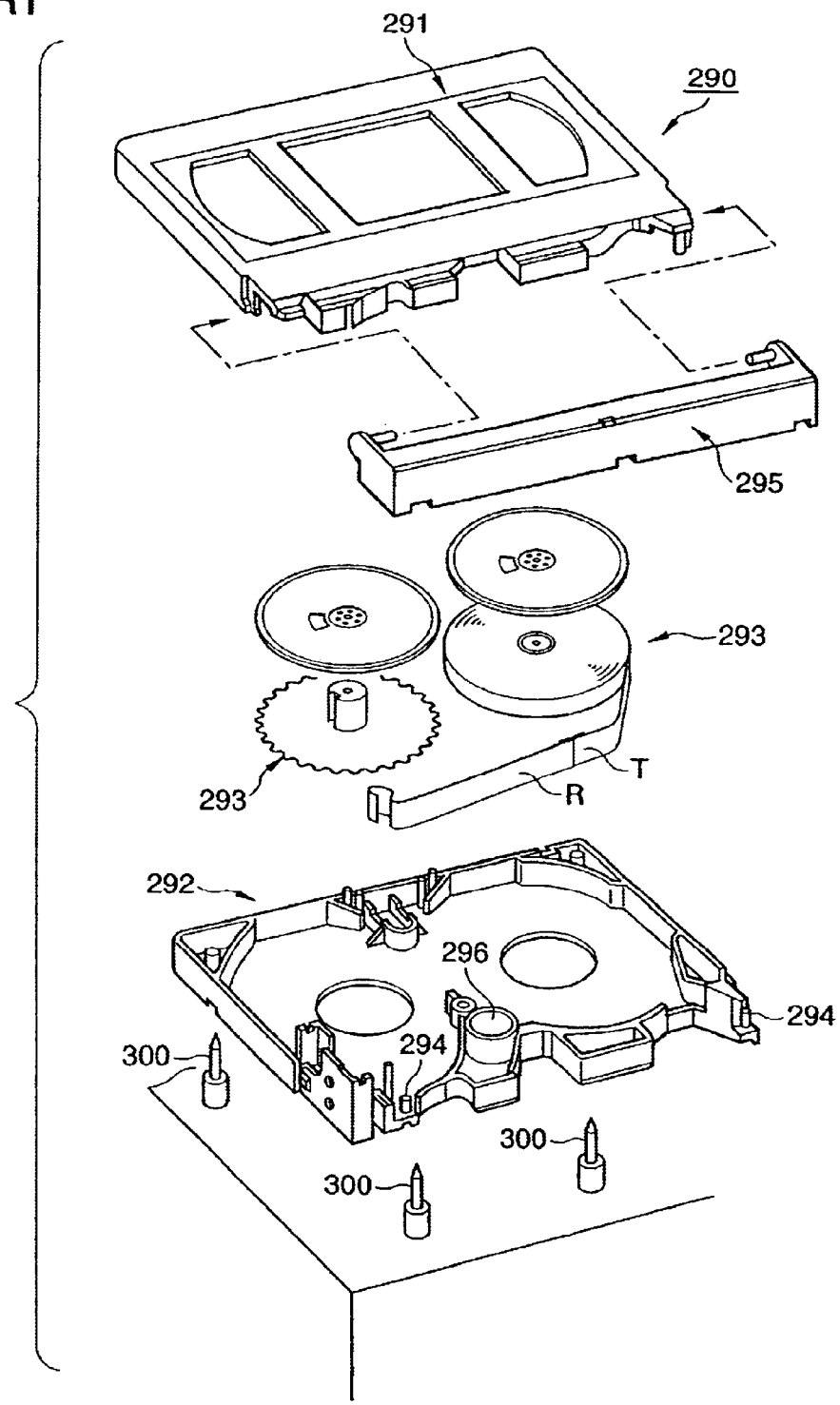
PRIOR ART FIG. 15

MAGNETIC TAPE CASSETTE

This is a divisional of application Ser. No 10/327,063, filed Dec. 24, 2002, which is a divisional of U.S. application Ser. No. 09/833,671 filed Apr. 13, 2001; now U.S. Pat. No. 6,643,096 the disclosure of which is incorporated herein by reference.

BACKGROUND OF THE INVENTION

1. Field of the Invention

The present invention relates to a magnetic tape cassette, particularly, the invention relates to a magnetic tape cassette including an urging plate spring for urging a tape reel, to one including a tape reel in use for a magnetic tape cartridge having reel a hub to be wound with a magnetic tape, to one including a reference positioning means, to one including a guide roller for guiding a magnetic tape, and to one including a cassette case having an information presenting section.

2. Description of the Related Art

A magnetic tape cassette which effects the recording/playing-back operation with such an arrangement that a magnetic tape wound on a couple of tape reels, while allowing its run, is held within a cassette case, is generally employed in many audio and video devices.

FIG. 3 is an exploded view showing a DVC (digital video cassette), which is one example of the magnetic tape cassette. A magnetic tape cassette 50 includes an upper cassette half 51 and a lower cassette half 52, each having a flat plate and a periphery wall. Those halves 51 and 52 are coupled together a plurality of screws 54. A couple of tape reels 60, each consisting of an upper flange and a lower flange, which are welded together, are rotatably supported within the lower cassette half 52 in a state that a magnetic tape 57 is wound on those tape reels.

Tape guides 55 are respectively provided on both sides of an opening 56 of the front side (this side in the figure) of the lower cassette half 52. The tape guides 55 guide the magnetic tape 57, which is fed from one of the tape reels 60 and taken up by the other, and moves the magnetic tape 57 through a predetermined position in the opening 56.

To secure the dust-proof performance high enough to withstand the outdoor condition, an outer lid 53a, an upper lid 53b and an inner lid 53c, which are lid members for covering the magnetic tape 57 tensioned between the couple of the tape guides 55 of the lower cassette half 52, are mounted on the front end of the upper cassette half 51 in a state that those may be opened and closed.

An opening is formed in the flat plate of the upper cassette half 51 such that it is covered with a transparent member 58.

Reel urging plate springs 70 are provided on a flat plate of the upper cassette half 51, while being respectively associated with the tape reels 60. The reel urging plate springs 70 are fastened to the upper cassette half 51, and urge the associated tape reels 60 toward the lower cassette half 52. As a result, the tape reels 60 are not shaky within the upper and lower cassette halves 51 and 52.

FIG. 4 is a diagram showing how the reel urging plate springs 70 urge the tape reels 60. Each the tape reel 60 includes a cylindrical hub 61 on which a magnetic tape is to be wound, a disc-like upper flange 62 provided on one end (the upper end in the figure) of the hub 61, and a disc-like lower flange 63 provided on the other end of the hub 61. A pivot 64 is provided at the center of the upper surface of the hub 61. The hub 61 serves as a contact part which comes in contact with the reel urging plate spring 70. In this instance, the hub 61, the lower flange 63 and the pivot 64 are formed in a one-piece construction.

A welding boss 65 is provided around the pivot 64. The upper flange 62 is welded on the upper surface of the hub 61 in such a manner that a welding horn (not shown) is brought into contact with the upper surface of the hub 61 in a state that the pivot 64 and the boss 65 are fit into the pivot and boss holes of the associated upper flange 62.

The top end of the pivot 64 is protruded above the upper surface of the upper flange 62. The reel urging plate spring 70 is fastened at its base to the flat plate of the upper cassette half 51 (see FIG. 3), and with its tip 70a, the top end of the pivot 64 is urged to the lower cassette half 52.

The lower flange 63, the hub 61 and the pivot 64 are made of resin of high rub resistance, e.g., polyoxymethylene (POM), in order to be durable when it is brought into contact with the drive shaft of a recording/playing-back device (not shown), the lower cassette half 52 (see FIG. 3) when the magnetic tape cassette drops, and the reel urging plate spring 70

The upper flange 62 is made of resin, which is cheaper in cost and inferior in rub resistance than POM. Example of such resin are acrylonitrile-butadinene-styrene (ABS) and polystyrene (PS).

If the lower flange 63, the hub 61 and the pivot 64 of each tape reel 60 are made of cheap resin with an intention of cost reduction of the magnetic tape cassette, the following problems arise.

Firstly, the tip of the pivot 64 made of cheap resin will be worn away through its contact with the reel urging plate spring 70 to produce cut powder since the rub resistance of the cheap resin is inferior to POM or the like. The cut powder thus produced will cause drop-out trouble and hinder smooth rotation of the tape reels 60.

One possible solution to this problem is that the lower flange 63 and the hub 61 are one-piece molded using cheap resin, and a hub 61 made of POM or the like is assembled into the hub 61. This approach, however, does not lead to the cost reduction of the magnetic tape cassette. Further, in a magnetic tape cassette, such as DVD or 8 mm cassette, in which the diameter of the hub 61 is small, it is difficult to use a separate pivot in manufacturing the tape cassette.

Next, a tape reel 106 of the magnetic tape cartridge, as shown in FIG. 9, includes a cylindrical reel hub 110 on which a magnetic tape 108 is wound, and a couple of upper and lower flanges 112 and 113 which are provided in the form of collars at the upper and lower ends of the reel hub 110 and position both side edges of the magnetic tape 108 wound on the reel hub 110.

In the tape reel 106 discussed here, as shown in FIG. 10, the upper flange 112 is integrally coupled to the upper end of the reel hub 110. The lower flange 113 and the reel hub 110 are joined together in a manner that a lib 113a protruded from the inner peripheral edge thereof is welded, by ultrasonic wave welding, to a step 110a formed along the peripheral edge of the lower end of the reel hub 110.

A new technique for increasing a recording density of a magnetic tape, which is contained in the magnetic tape cartridge, is disclosed in Japanese Patent Unexamined Publication No. Hei. 8-30932(JP-A-8-30932), for example. The technique is a magnetic tape writing system in which the operations of reading data from and writing data onto a magnetic tape are controlled in accordance with servo patterns written in the magnetic tape in advance In the magnetic tape writing system, servo tracks for storing servo patterns indicative of tape position information and data tracks for storing data are arranged in the tape width direction. The reading/writing operations by the magnetic head is controlled in accordance with servo patterns written in the magnetic tape.

FIGS. 11 and 12 show constructions including a write head and its vicinities in a servo pattern writer, which writes or records servo patterns onto the magnetic tape used in the magnetic tape writing system.

Guide posts 123 and 124 for guiding the magnetic tape 108 to a write head 121, as shown in FIG. 11, are provided on both sides of the write head 121 for recording servo patterns. An arrow X in FIGS. 11 and 13 indicates a traveling direction of the magnetic tape 108.

In the illustrated example, as shown in FIG. 12, five servo tracks T11 to T15 for storing servo patterns are arranged at fixed spatial intervals in the tape width direction. Four regions each located between the adjacent servo tracks are used as data tracks T21 to T24 for storing data. Those data tracks T21 to T24 are each further divided into a plurality of narrow tracks (not shown).

The write head 121, as shown in FIG. 12, includes five gaps G1 to G5 used for recording servo patterns, which correspond in position to the servo tracks T11 to T15 on the magnetic tape 108.

Block patterns P1 and P2 each consisting of a plurality of slanted linear magnetized regions are formed in each of the servo tracks T11 to T15 as shown in FIG. 13. Servo patterns written into the linear magnetized regions of the block patterns P1 and P2 enable one to know positions on the magnetic tape. The writing/reading operation of data to and from the data regions is performed on the basis of the position information.

The writing of servo patterns into servo tracks T11 to T15 is carried out when the magnetic tape is initialized in the manufacturing process of the magnetic tape. In this case, servo patterns are written onto the magnetic tape over its entire length by use of a servo pattern writer, which is designed for servo pattern writing.

In the magnetic tape writing system, the data track regions may be managed more discretely and accurately. Accordingly, the recording density of the magnetic tape can be remarkably increased, when considering from a theoretical point of view.

In the servo pattern writer for initially writing servo patterns onto the magnetic tape and the magnetic tape writer for writing/reading data on and from the magnetic tape in the magnetic tape writing system, if the running of the magnetic tape is disturbed above the write head, the writing/reading operation of the servo patterns is erroneous. As a result, the merit of high density recording is not effectively utilized.

Therefore, some contrivance to run the magnetic tape more accurately and stably is required in the servo pattern writer for initially writing servo patterns onto the magnetic tape and the magnetic tape writer for writing/reading data on and from the magnetic tape in the magnetic tape writing system.

Improvement of an operating accuracy of the tape running system in the magnetic tape writer and the like is not easy. Further, such an approach frequently brings about increase of the cost to manufacture.

The tape running stability, if realized through the improvement of the tape running system, does not lead to the improvement of the accuracy in the writing and reading of the servo patterns. The reason for this is that the tape running stability depends greatly on the dimensional accuracy or the like of the tape reels on which the magnetic tape is wound.

In the tape reel 106, the tape edges of the both sides of the magnetic tape 108 wound on the reel hub 110 are positioned by the pair of the upper flanges 112 and 113. In order that a form of the winding of the magnetic tape is kept good with less variation of the tape edge position, a dimension WF between the flanges 112 and 113, as shown in FIG. 10, is selected to be closest to a width dimension WT of the magnetic tape.

If the flange-to-flange dimension WF is too close to the tape width dimension WT, the contact resistance of the tape edges to the flanges 112 and 113 during the tape running is large, however. As a result, the tape running is disturbed, and the writing and reading operations of the servo patterns are frequently erroneous. Particularly when the dimension WF between the paired flanges 112 and 113 is uniform in value over the flange as viewed in the radial direction, the following problem arises. In this case, the diameter of the magnetic tape wound on the tape reel varies, and hence the peripheral speed of the flange varies. Consequently, the contact resistance of the tape edges to the flanges 112 and 113 varies.

If to prevent such a disadvantage, the dimension WF between the flanges 112 and 113 is carelessly increased, the form of the magnetic tape 108 wound on the tape reel 106 is deformed or disfigured.

The magnetic tape cassette is widely used for a recording medium. There are various types of magnetic tape cassettes, such as audio, video and computer tape cassettes. Those types of magnetic tape cassettes may also be categorized into an analog magnetic tape cassette and a digital magnetic tape cassette.

The basic constructions of those magnetic tape cassettes are substantially the same; a magnetic tape, while being movable, is held within a cassette case.

FIG. 15 is a exploded view showing a VHS video cassette as an example of the magnetic tape cassette. A magnetic tape cassette 290 includes an upper cassette half 291 and a lower cassette half 292, each including a flat plate having walls standing erect along its peripheral edge. A couple of tape reels 293 around which a magnetic tape T are rotatably supported within the lower cassette half 292. A transparent reader tape R is jointed to the end of the magnetic tape T. The tape reels 293 are disposed on the lower cassette half 292 such that the magnetic tape T is put between a pair of tape guides 294, which are provided on the front end of the lower cassette half 292.

The lower cassette half 292 and the upper cassette half 291 are combined into the cassette case. The magnetic tape T is exposed through the front end of the cassette case. A guard panel 295 as a cover member is rotatably mounted on the cassette case while covering the front side of the magnetic tape T. An insertion hole 296 is formed at the center of the front end of the flat plate of the lower cassette half 292.

When the magnetic tape cassette 290 or the like is loaded into a magnetic tape drive unit (referred to as a "hard drive"), such as a VTR (video tape recorder), a plurality of positioning pins 300 provided on the hard drive are brought into engagement with predetermined positions (reference positioning means) of the lower cassette half 292. As a result, the magnetic tape cassette 290 is positioned in place within the hard drive.

Recently, with a change of design sense, a transparent or semitransparent product of the skeleton type comes out in the market. In the product, a case of an electric device or the like is translucent so as to allow the inside of the case to be seen from outside. To match such a design trend, there is a demand to make translucent the cassette case made of black or blue resin, which is used in the conventional magnetic tape cassette.

To make translucent the cassette case of the magnetic tape cassette, the strengthening of the resin used and the maintaining of the sliding resistance of the resin come up as the subjects to be solved. Particularly, cut powder that is produced at the contact portion at which the positioning member, e.g., positioning pins 300 comes in contact with the reference positioning means, attaches to the tape, to present various problems, such as drop-out. This leads to deterioration of the product quality.

When the transparency of the resin is increased, the mechanical strength and the wear resistance of the resin are likely to be deteriorated because its physical property.

One possible way to solve the problem is to mix a compound, e.g., additive, with an intention of increasing the resin strength, in the stage of manufacturing the cassette case. This approach, however, brings about the increase of the cost to manufacture, and the product cost.

A magnetic tape cassette is widely used for a recording medium. The magnetic tape cassette is classified into a public-use magnetic tape cassette and a business-use magnetic tape cassette when it is classified on the basis of its use. FIG. 18 is an exploded view showing a mechanical arrangement of component parts in a Beta cam L cassette which is a business-use magnetic tape cassette.

As shown in FIG. 18, the Beta cam L cassette (referred to merely as "magnetic tape cassette") 370 is made up of an upper cassette half 371 and a lower cassette half 372, a pair of tape reels 373 which are to be wound with a magnetic tape T and located within the upper and lower cassette halves 371 and 372, and a lid 374 which may open and close an opening of the front ends of the upper and lower cassette halves 371 and 372.

Guide rollers 375 and guide pins 377 made of metal, which are wound with the magnetic tape T, are mounted on both sides of the opening of the front end of the lower cassette half 372. The lower cassette half 372, which is in sliding contact with the reverse side of the magnetic tape T, is attached to the lower cassette half 372. Reel springs 379 for urging the tape reels 373 are attached to the upper cassette half 371. The upper and lower cassette halves 371 and 372 are coupled together by means of a plurality of screws 380.

Of those component parts, the guide rollers 375 are made of resin, e.g., POM, which is good in sliding property and mechanical strength. The guide rollers 375 are cylindrical. A rotary shaft pin 376 mounted on the lower cassette half 372 is inserted into the center hole of each of the guide rollers 375. With use of the pins, the guide rollers 375 are rotatably supported on the lower cassette half 372.

FIG. 19 is an enlarged view showing a structure including the guide rollers 375 and the guide pins 377 of the lower cassette half 372 when viewed in the direction of an arrow B in FIG. 18. In FIG. 19, there is illustrated a state of the structure when the magnetic tape T is put on the guide roller 375 and the guide pin 377. Between the tape reel 373 and the guide roller 375, a pad 378 is in sliding contact with the reverse side of the magnetic tape T and urges the magnetic tape T. With this, the magnetic tape T is in sliding contact with the circumferential outer surface of the guide rollers 375. When the reel urging plate spring 370 is loaded to a record/playback apparatus (not shown), and the apparatus is placed to a playback mode or a rewind mode, the magnetic tape T passes the outer surface of the guide rollers 375, is taken out of the cassette case, and is wound on the magnetic head.

FIG. 20 is a cross sectional view taken line in V—V in FIG. 19. The guide rollers 375 are cylindrical and guide the magnetic tape T with their outer surfaces. The upper end face 375a and the lower end face 375b of the guide rollers 375 are brought into contact with the flat plate of the upper cassette half 371 and the flat plate of the lower cassette half 372, respectively.

When the magnetic tape T runs, the guide rollers 75 rotate following up the running of the magnetic tape.

In the magnetic tape cassette as mentioned above, when the guide rollers 375 rotate following the magnetic tape T, the upper end face 375a and the lower end face 375b of the guide rollers 375 are frequently worn. When the guide rollers 375 rotate, and the upper end face 375a and the lower end face 375b of the guide rollers 375 come in sliding contact with the upper cassette half 371 and the lower cassette half 372, cut powder is frequently produced at the contact portions at which the upper end face 375a and the lower end face 375b are brought into contact with the upper cassette half 371 and the lower cassette half 372. The cut powder will cause serious errors, e.g., drop out.

A magnetic tape cassette is widely used for a recording medium. The magnetic tape cassette is classified into audio, video, and computer cassettes and others. Those magnetic tape cassettes may be classified into a public-use magnetic tape cassette and a business-use magnetic tape cassette when it is classified on the basis of its use. Examples of the magnetic tape cassette of the digital type are DAT (digital audio tape) cassette, DVC (digital video cassette), and DDS (digital data storage) cassette. The video magnetic tape cassette may be classified into VHS and Beta video cassettes.

The basic constructions of those magnetic tape cassettes are substantially the same; a tape reel with a magnetic tape wound thereon is housed in a cassette case.

FIG. 22 is a perspective view showing a VHS magnetic tape cassette 440, which is one form of the video magnetic tape cassette. An external appearance of the magnetic tape cassette 440 is substantially defined by an upper cassette half 441 and a lower cassette half 442, each being constructed such that the periphery walls stand erect on a flat plate, and a guard panel 445 as a cover member.

The upper cassette half 441 and the lower cassette half 442 are combined into a cassette case 440a. A couple of tape reels 450 with a magnetic tape T wound thereon are rotatably housed in the cassette case 440a. A label area 447 is provided in the central portion of a flat plate 41a of the upper cassette half 441. A window 446 is located adjacent to the label area 447. The window 446 includes a transparent window member through which a user visually checks a volume of the winding of the magnetic tape T within the cassette case 440a. The magnetic tape is exposed through the front end of the cassette case 440a.

The guard panel 445 is mounted on the cassette case 440a in a hinged manner, while covering the front end of the magnetic tape T.

As described above, various forms and types of the magnetic tape cassettes are known. Further, the magnetic tape cassettes are classified on the basis of the type of magnetic tape contained and the length of the recording time of the magnetic tape. In the VHS magnetic tape cassette, for example, four types of tape cassettes are used which have the recording time lengths of 30, 60, 120 and 160 minutes.

In the case of the magnetic tape cassette 440, a label 460, which describes a recording time left, the type of cassette (recorded information) and the like, is stuck to the label 460. A label 461 describing a title and the like (recording information) of the contents recorded in the magnetic tape T is stuck to a label area 448, which is located on the rear side wall 440b of the cassette case 440a as the rear end of the magnetic tape cassette 440.

Recently, it is regarded as important to provide advertisement or the like based on user's needs to users, as typically found in the internet advertisement.

The inventor found the fact that useful information will possibly be presented to the user by putting advertisement and the like on the magnetic tape cassette.

A specific implementation of the idea is such that information on movies are visually attached to a magnetic tape storing a video software, which is lent out in a rental video shop, and in this case, the former movies belong to the same genre as of a movie stored in the magnetic tape lent out.

SUMMARY OF THE INVENTION

A main object of the present invention is to provide a magnetic tape cassette which overcomes the above problems and has a high commercial value.

According to a first aspect, for providing a magnetic tape cassette which allows the cost to manufacture to be reduced, the present invention will be described as bellows.

There is provided a magnetic tape cassette having tape reels, which are located within a cassette case and on which a magnetic tape is wound, and at least one reel urging plate spring for urging the tape reel to a predetermined side within the cassette case. In this structure, a contact part of the reel urging plate spring at which the reel urging plate spring comes in contact with the tape reel, is subjected to a surface treatment so as not to create its friction against the tape reel.

The reel urging plate spring was formed by pressing an SUS plate-like member, and a 10-points average roughness (Rz) of its surface was within 0.6 $\mu$m to 1.0 $\mu$m. Those surface roughness values naturally resulted from the pressing of the SUS plate for spring use, and a factor of contact resistance was not taken into account. The inventors of the present patent application discovered the fact that its contact resistance against the pivot is reduced if the roughness Rz at the contact part of the reel urging plate spring is set at 0.5 $\mu$m or less, and hence that even if the pivot is made of cheap resin, the cut powder produced is remarkably reduced in amount. A relationship between the surface roughness Rz at the contact portion of the reel urging plate spring and the pivot abrasion quantity are shown in Table 1.

| Surface roughness (Rz) | 0.8 | 0.6 | 0.5 | 0.4 | 0.2 |
|---|---|---|---|---|---|
| Pivot abrasion quantity (mm) | 0.8 | 0.7 | 0.3 | 0.2 | 0.1 |

In gathering the data in the table, a pressing force of the reel urging plate spring was 0.9N, the number of revolutions of the tape reel was 2000 to 2200 rpm, and the diameter of the cylindrical pivot was 1.5 mm. The tape reel was continuously and repeatedly rotated 300 times.

Table 1 also shows that the abrasion quantity is remarkably increased when Rz>0.5.

The surface roughness Rz of the contact part can be 0.5 $\mu$m or less by subjecting the contact part to smoothing process, hard chromium plating process or the like. The smaller the surface roughness Rz is, the better it is, from a view point of lessening the cut powder generation. Practically, 0.5 $\mu$m is the lower limit value when the working accuracy, cost and the like are taken into consideration, however.

Since the magnetic tape cassette is thus constructed, the lower flange, hub and pivot may be one-piece molded by using cheap resin, such as ABS and PS. Accordingly, the cost of manufacture the magnetic tape cassette is reduced.

In a second aspect, a secondary object of the invention is to provide a tape reel in use for a magnetic tape cartridge which 1) maintains a good form of the magnetic tape wound on the tape reel, thereby increasing the product value of the magnetic tape cartridge in which a magnetic tape is wound on the tape reel contained therein, 2) is free from the tape running disturbance caused by an increase of the contact resistance of the tape edges of the running tape to the flanges of the tape reel, 3) is free from troubles caused by the tape running disturbance when servo patterns are written onto and read from the magnetic tape, and 4) realizes the improvement of the performances of writing and reading servo patterns onto and from the magnetic tape in the magnetic tape writer or the like.

To achieve the secondary object, the present invention provided a tape reel in use for a magnetic tape cartridge having a reel hub to be wound with a magnetic tape in which servo tracks for storing servo patterns and data tracks for storing data are arranged in the tape width direction, and a pair of upper and lower tape flanges which are provided in the form of collars at the upper and lower ends of the reel hub and position both side edges of the magnetic tape wound on the reel hub. In the tape reel, a dimension between the flanges is selected so as to satisfy the following requirements:

1) the writing and reading operations of the servo patterns to and from the servo tracks of the magnetic tape are not hindered by the disturbance of the running of the magnetic tape when the tape edges of the magnetic tape come in contact with the flanges and; and 2) positional variations of the tape edges of the magnetic tape wound on the reel hub fall within a tolerable range, thereby maintaining a good form of the winding of the magnetic tape.

A distance between a couple of flanges 135 and 136 is selected to be a value at which a form of the winding of a magnetic tape on a tape reel is kept good, and the tape running is not disturbed by the increase of a contact resistance of the tape edges to the flanges of the tape reel.

Accordingly, the form of the winding of the magnetic tape on the tape reel is kept good, and the external appearance of the magnetic tape cartridge in which the magnetic tape is wound on the tape reel is improved. In this sense, the product value is increased. Further, the tape running is not disturbed by the increase of the contact resistance of the tape edges to the flanges of the tape reel during the tape running. The writing and reading of the servo patterns to and from the magnetic tape wound on the tape reel is not hindered by the tape running disturbance. The improvement of the performance of writing and reading the servo patterns to and from the magnetic tape is realized at low cost in the magnetic tape writer or the like.

In the case of the tape reel for a magnetic tape cartridge, 1) for the dimension WF between the flanges, the inside diameter of the flange is larger than the width dimension WT of the magnetic tape by about 0.1 mm to 0.35 mm, and the outside diameter of the flange is larger than the width dimension WT of the magnetic tape by 0.2 mm to 0.55 mm. 2) The inner surface of one of the flanges is tapered so that the dimension WF between the flanges gradually increases from the inside diameter side of the flange to the outside diameter side.

With such a construction, even if the peripheral speed of the flanges varies with a variation of the diameter of the winding of the magnetic tape on the tape reel, the contact resistance of the tape edges to the flanges less varies. Accordingly, the tape running disturbance caused by the increase of the contact resistance of the tape edges to the tape reel during the tape running is more reliably prevented.

In the tape reel for the magnetic tape cartridge, the couple of flanges 135 and 136 are preferably made of polycarbonate resin containing glass fibers, which is excellent in mechanical strength and heat resistance.

The servo patterns are written to the magnetic tape within the magnetic tape cartridge before its delivery. In order to maintain good running stability of the tape, it is preferable that the dimension between the paired flanges of the tape reel remains not varied for a long time, from the product delivery.

If a material making one of the flanges is different from that making the other, the following problem arises. The flanges will be expanded and deformed by a temperature variation during the transportation for the product delivery and a temperature cycle in its long time use. In this case, the expansion and deformation of one of the flanges are different from those of the other. As a result, the dimension between the flanges of the tape reel loses its proper dimensional value.

If each flange is made of polycarbonate resin containing glass fibers, which is excellent in mechanical strength and heat resistance, it does not happen that the flanges of the tape reel are deformed by a temperature variation during the transportation for the product delivery and a temperature cycle in its long time use. Further, the proper dimensional value of the dimension between the flanges as originally set may be maintained for a long time, from the product delivery. Accordingly, the running stability of the magnetic tape and the form of the winding of the magnetic tape can be kept satisfactory and good for a long time.

According to a third aspect, for providing a magnetic tape cassette which prevents the cut powder from being produced, and is low in the cost to manufacture, the present invention will be described as belows.

In the present invention, there is provided a magnetic tape cassette in which a magnetic tape is held within a cassette case while being movable. In the magnetic tape cassette, positioning portions, which are provided on a lower cassette half for positioning the magnetic tape cassette relative to a magnetic tape drive device, are formed of resin that is different from the resin of the remaining part of the cassette case.

A strength of the positioning portions of the cassette case is increased by forming the positioning portions of a material, which is different from that of the remaining portion of the cassette case. To this end, two-color molding may be used, or the positioning portions of the cassette case may be formed separate from the remaining portion of the cassette case.

In the thus magnetic tape cassette using the lower cassette half, the cassette case is not damaged when the reference positioning means are brought into contact with the positioning members, although the cassette case is formed translucent. Further, the magnetic tape cassette can be manufactured at low cost.

Since such a strength as not to damage the cassette case is secured, no problems arise if the reference positioning means is formed translucent.

In the specification, the term "translucent" of an article means a visual state of a thing allowing one to see the inside of the magnetic tape cassette through the article, and it may be chromatic or achromatic.

Further, the term "strength" involves properties which does not cause the cassette case to be cracked and not produce cut powder, such as wearing resistance, impact resistance, viscosity and others.

According to a fourth aspect, a secondary object of the present invention is to provide a magnetic tape cassette which can prevent the cut powder from being produced.

To achieve the secondary object, the present invention provides a magnetic tape cassette in which guide rollers each having a cylindrical outer surface are rotatably supported in a cassette case consisting of the combination of an upper cassette half and a lower cassette half. In this structure, at least one of the upper end face and the lower end face of each said guide roller is surface treated so that said end face is not worn through its contact with said upper cassette half or lower cassette half.

The guide roller may take any form if it has a cylindrical outer surface. When the guide roller 315 used is shaped like a barrel, the amount of the cut powder is remarkably reduced. The barrel shaped guide roller is configured such that the largest diameter of the guide roller is at the center as viewed in the axial direction and the smallest outside diameter is at both ends, and the outside diameter of the guide roller gradually decreases from the center to both ends as viewed in the axial direction.

Examples of the surface treatment are a smoothing treatment and a heat treatment, e.g., ironing treatment. If the heat treatment is used, heat treatment temperature is preferably lower than a melting point of resin.

In the magnetic tape cassette thus constructed, no wearing occurs at the contact portions of the upper and lower end faces of the guide rollers with the upper and lower cassette halves. That is, the upper and lower end faces of the guide roller are subjected to a predetermined surface treatment. As a result, not only the upper and lower end faces but also the upper and lower cassette halves which are in contact with them become resistive to abrasion.

Accordingly, the amount of the cut powder produced is remarkably reduced.

According to a fifth aspect, a secondary object of the present invention is to provide a magnetic tape cassette having a display space for displaying information different from the information recorded in the magnetic tape cassette.

To achieve the secondary object, the present invention provides a magnetic tape cassette in which a magnetic tape, while being movable, is held within a structure consisting of appearance defining members and label areas are provided on the appearance defining members. In this structure, an information presenting section for displaying information, which is different from the recording information on the magnetic tape cassette, is provided at a location other than label areas of appearance defining members to which labels representing the recording information on the magnetic tape cassette are stuck.

With such a construction, the magnetic tape cassette may display information, which is different from the recording information on a magnetic tape cassette, in an information display section which is located at a location other than label areas in which the recording information on the magnetic tape cassette is displayed. Accordingly, the magnetic tape cassette, which is used for selling and lending video software items, may be effectively used as an advertising medium by putting an advertisement in the information display section of the cassette.

Examples of the appearance defining members are upper and lower cassette halves, and a cover member (guard panel).

Examples of the recording information on the magnetic tape cassette are the type of a cassette case, the type of a magnetic tape housed in the cassette case, a recording time left of the magnetic tape, and a title of the video software stored.

The information different from the recording information on the magnetic tape cassette may be advertisement, rental information, logo marks, inventory management codes, bar codes and the like.

The advertisement is not limited to specific ones; however, it is preferably useful for users who are at a high frequency at which they watch the contents stored in the magnetic tape cassette.

An example of the advertisement is an advertisement of a movie belong to the same genre as of a movie stored in the cassette. When an age group of users who want to watch the contents of the cassette is specified, the advertisement may be shopping and shop advertisements which attract those users of the age group. Thus, the preferable advertisement has given relations to the contents stored.

Examples of rental information are genre, film director, cast and the like of a movie or the like stored in a rental video, which is lent out in the video shop. Titles of rental videos which will be lent out in near future may also be enumerated for the advertisement.

The information different from the recording information on the magnetic tape cassette may be attached to the appearance defining member or members by label pasting, printing, transferring, engraving, molding or the like.

The information may be visually presented by attaching an information terminal, e.g., an LCD unit, to the appearance defining member.

BRIEF DESCRIPTION OF THE DRAWINGS

FIG. 15 is an exploded view showing a conventional magnetic tape cassette;

DETAILED DESCRIPTION OF THE PREFERED EMBODIMENT

Figure 1:
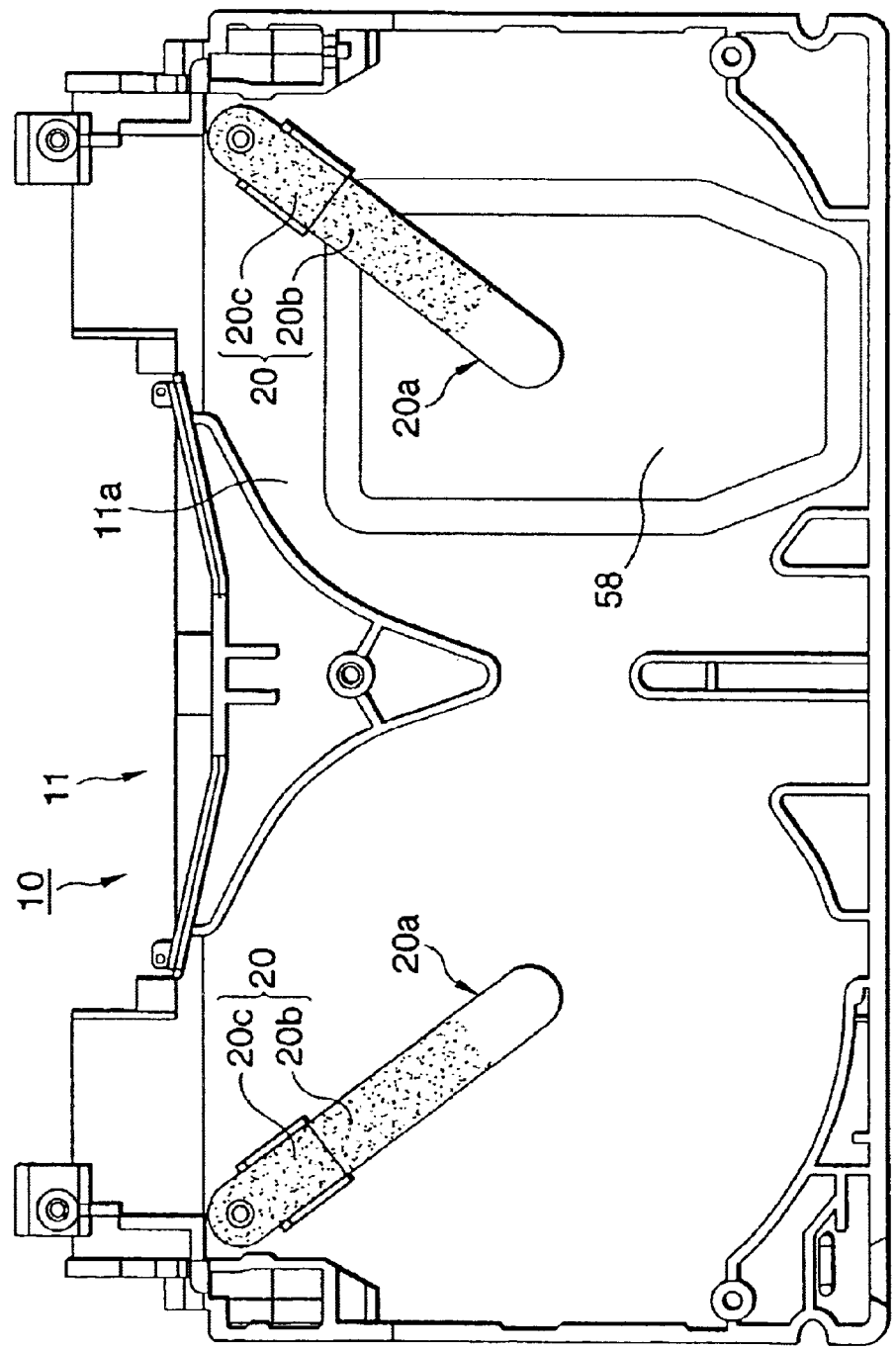
FIG. 1 is a plan view showing an upper cassette half in a first embodiment base on a first aspect of the present invention.

According to a first aspect, the preferred embodiment of the present invention will be described with reference to the accompanying drawings.

Components and parts already described will be designated by like reference numerals, and description thereof will be given in brief or omitted, for simplicity.

FIG. 1 is a plan view showing a structure on the inner side of an upper cassette half 11 in a magnetic tape cassette (as a business use DVC) 10, which is a first embodiment of the present invention. A window opening is formed in a rectangular flat plate 11a of the upper cassette half 11, while being covered with a window member 58. A pair of reel urging plate springs 20 are provided on a flat plate 11a, while extending from the upper corners to the center of the flat plate. Each reel urging plate spring 20 is formed by bending a strip-like member, and includes a base 20c and an arm 20b. The base 20c is welded onto the flat plate 11a of the upper cassette half. The arm 20b is raised from the flat plate 11a toward the tape reel side (this side in the paper surface of the drawing).

A top end portion 20a of the arm 20b will serve as a contact part at which the arm is brought into contact with the tape reel. A 10-points average roughness of the surface of the top end portion 20a is set at 0.5 μm or less.

In the magnetic tape cassette 10 with the upper cassette half 11, the top end portion 20a of the reel urging plate spring 20 is smooth, and its contact resistance against the pivot of the tape reel is small. Accordingly, there is no chance that the pivot is damaged with the reel urging plate spring 20 and cut dust is produced. Therefore, the pivot of the tape reel may be made of cheap resin, so that the cost to manufacture the magnetic tape cassette is reduced. If the pivot, and the hub and lower flange are one-piece molded using cheap resin, further cost reduction is realized.

Figure 2:
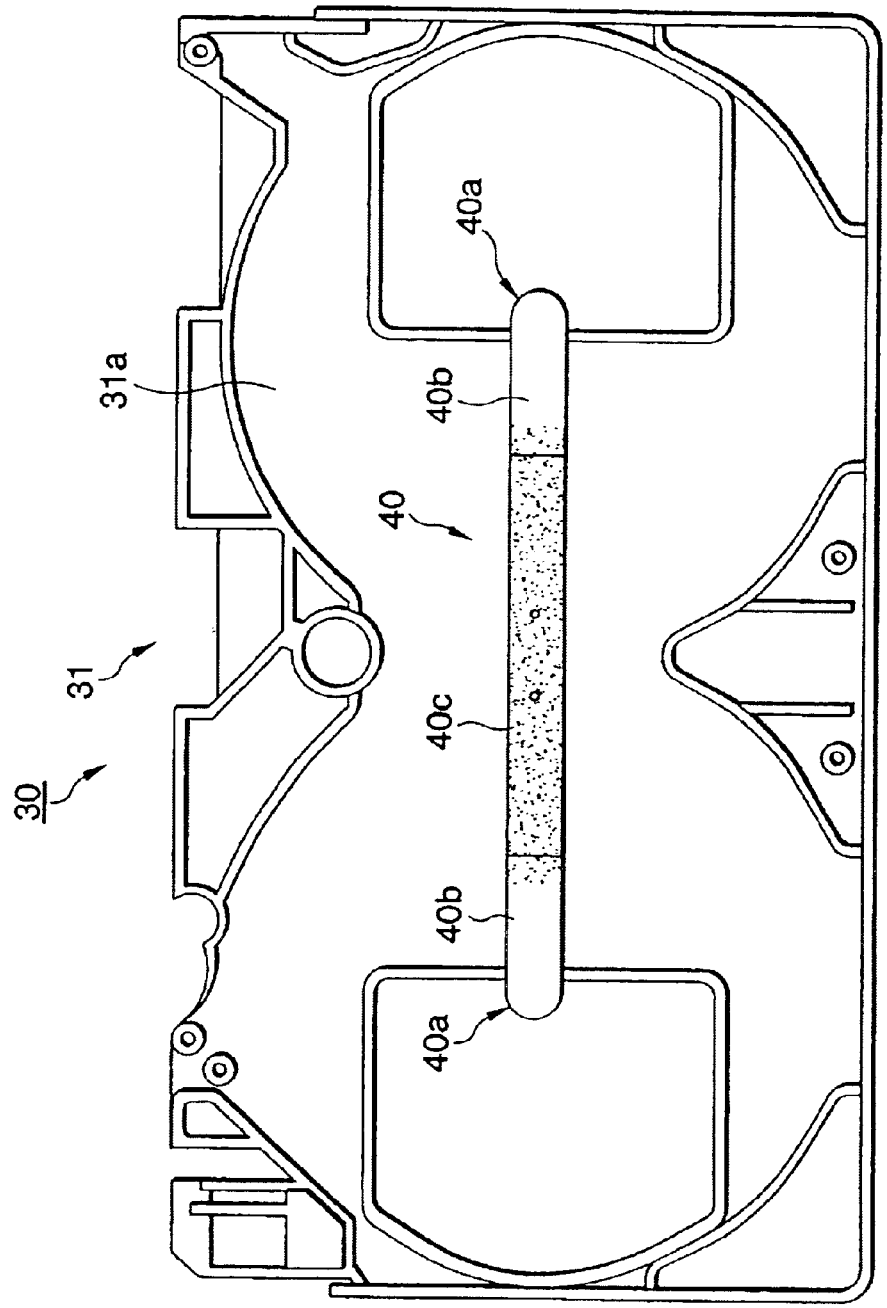
FIG. 2 is a plan view showing an upper cassette half in a second embodiment based on the first aspect of the present invention.
Figure 3:
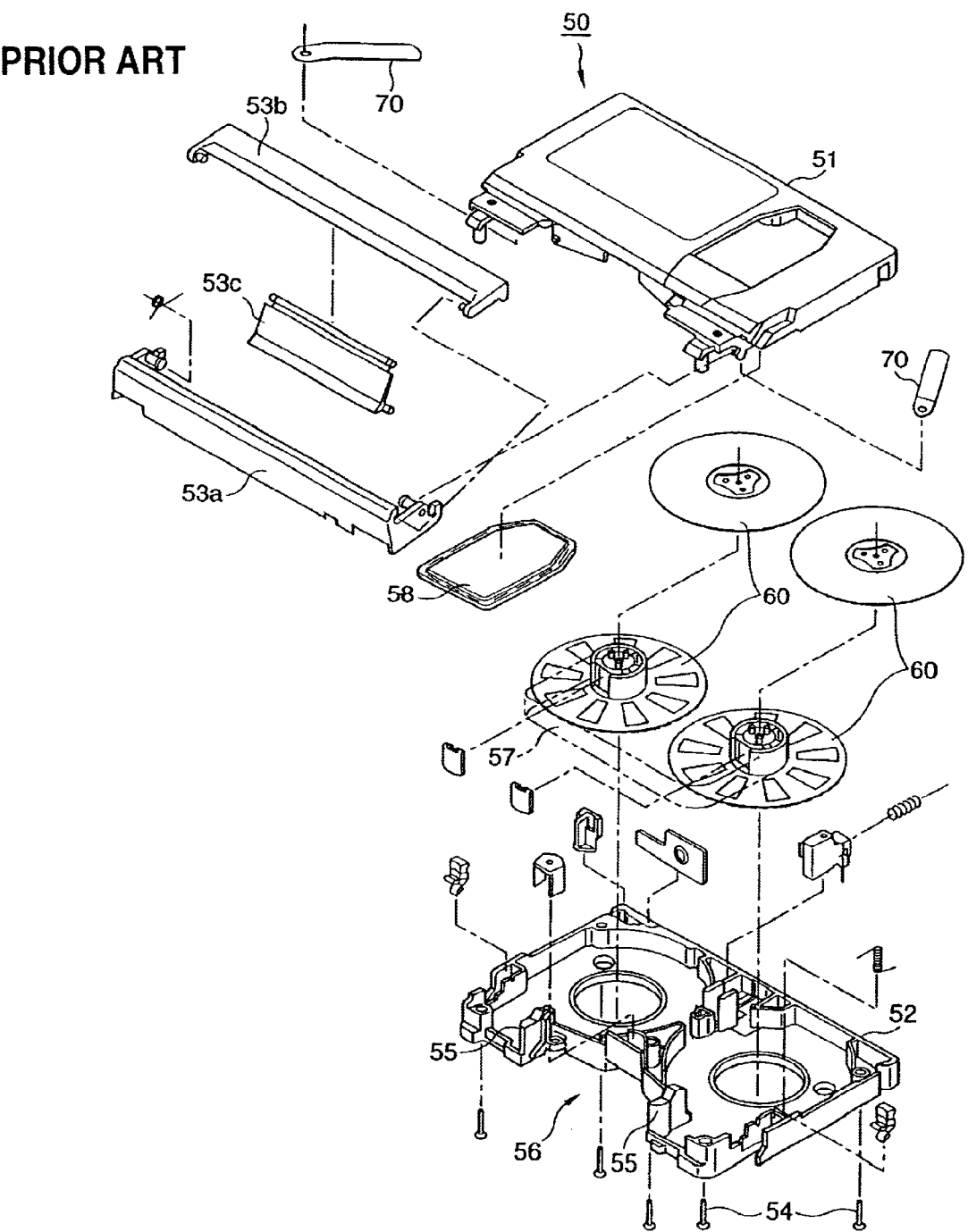
FIG. 3 is an exploded view showing a conventional magnetic tape cassette.
Figure 4:
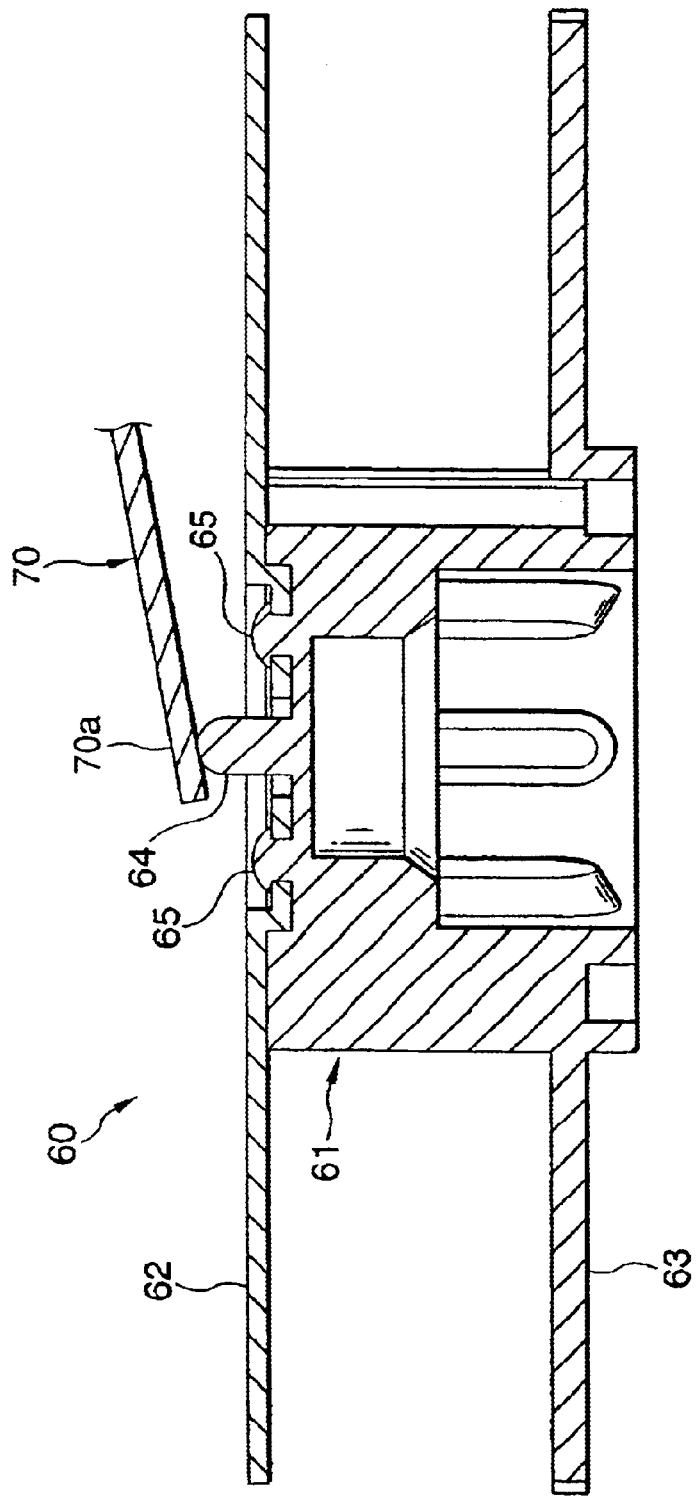
FIG. 4 is a diagram showing a reel urging plate spring and a tape reel in the conventional magnetic tape cassette.

FIG. 2 is a plan view showing an inner structure of an upper cassette half 31 in a magnetic tape cassette (as a VHS video cassette) 30, which is a second embodiment of the present invention.

A single reel urging plate spring 40 is provided on a rectangular flat plate 31a of the upper cassette half 31 in a state that the plate spring longitudinally extends in the central portion as vertically viewed. The reel urging plate spring 40 is formed such that a strip-like member is bent such that arms 40b are raised from both ends of a base 40c. The base 40c is welded onto the flat plate 31a of the upper cassette half. The arms 40b are raised from the upper cassette half 31 to the tape reel (not shown) side (this side in the paper surface of the drawing).

Top end portions 40a of the arms 40b will serve as contact parts at which the arms are brought into contact with the tape reel. A 10-points average roughness of the surface of each top end portion 40a is set at 0.5 µm or less.

It should be understood that the present invention is not limited to the above-mentioned embodiments, but may variously be modified, altered and changed within the true spirits of the invention.

The entire surface of the reel urging plate spring may be smoothed, while only the top end portion of it is smoothed in the above-mentioned embodiments.

When a portion of the reel urging plate spring other than the top end portion thereof is brought into contact with the tape reel (pivot), smoothing of that portion other than the top end portion will suffice.

It is evident that the present invention may be applied to other magnetic tape cassettes than the DVC and the VHS video cassette.

As seen from the foregoing description, in the thus constructed magnetic tape cassette of the invention, the lower flange, the hub, the pivot, and the like may be one-piece molded using cheap resin. This fact leads to the reduction of cost to manufacture.

According to a second aspect, the preferred embodiments of a tape reel in use for a magnetic tape cartridge according to the present invention will be described with reference to the accompanying drawings.

Figure 5:
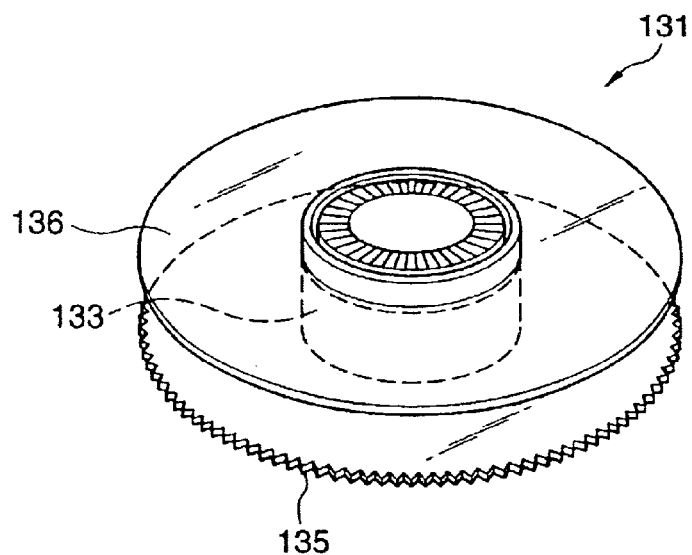
FIG. 5 is a perspective view showing a tape reel for a magnetic tape cartridge which is an embodiment based on a second aspect of the present invention.
Figure 6:
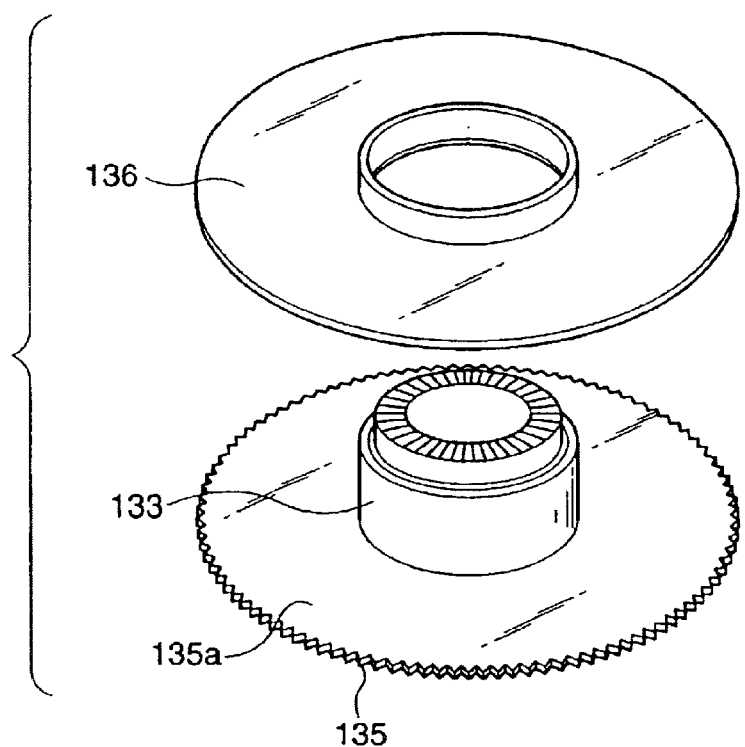
FIG. 6 is an exploded view showing the tape reel shown in FIG. 5.
Figure 7:
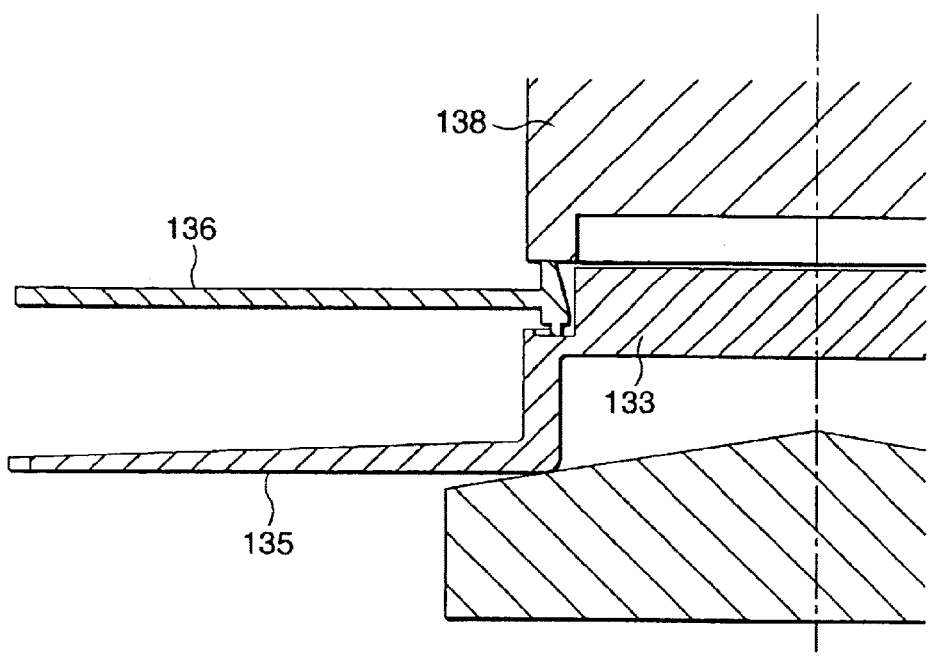
FIG. 7 is a longitudinal sectional view for explaining a method of jointing a pair of flanges of the tape reel as shown in FIG. 5.
Figure 8:
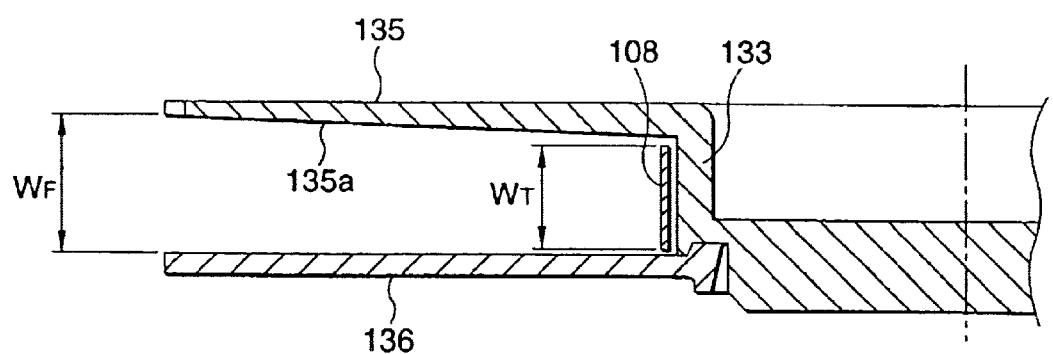
FIG. 8 is a longitudinal sectional view showing the tape reel shown in FIG. 5.
Figure 9:
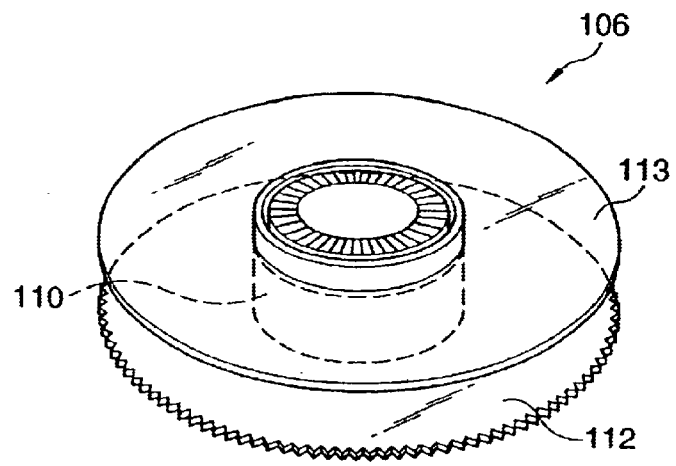
FIG. 9 is a perspective view showing a conventional tape reel used for a magnetic tape cartridge.
Figure 10:
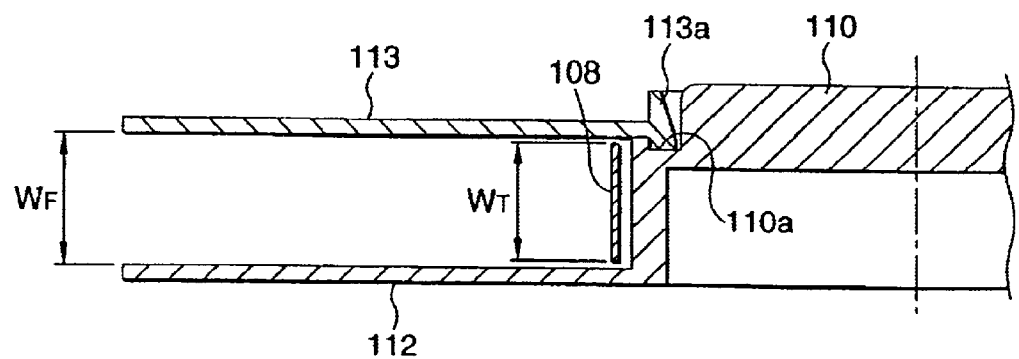
FIG. 10 is a longitudinal sectional view showing the tape reel of FIG. 9.
Figure 11:
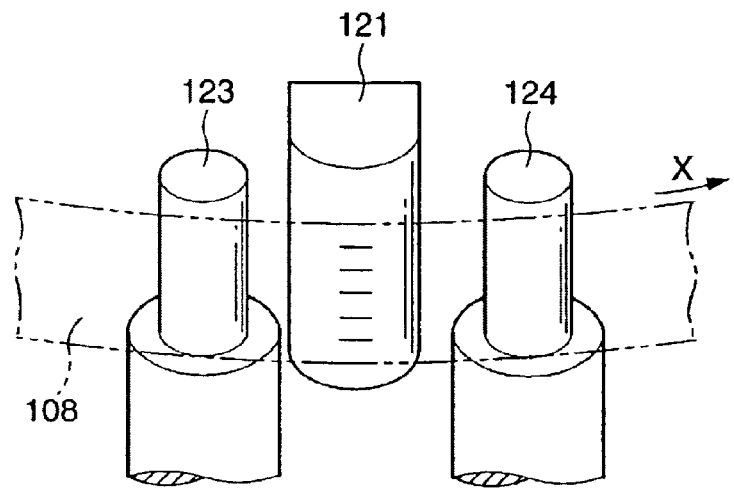
FIG. 11 is a perspective view showing a relationship between a magnetic tape for storing servo patterns and a write head for writing servo patterns.

FIGS. 5 through 8 show an embodiment of a tape reel in use for a magnetic tape cartridge according to the second aspect of the present invention. FIG. 5 is a perspective view showing the tape reel according to the embodiment of the present invention. FIG. 6 is an exploded view showing the tape reel shown in FIG. 5. FIG. 7 is a longitudinal sectional view for explaining a method of jointing a pair of flanges of the tape reel as shown in FIG. 5. FIG. 8 is a longitudinal sectional view showing the tape reel shown in FIG. 5.

Figure 12:
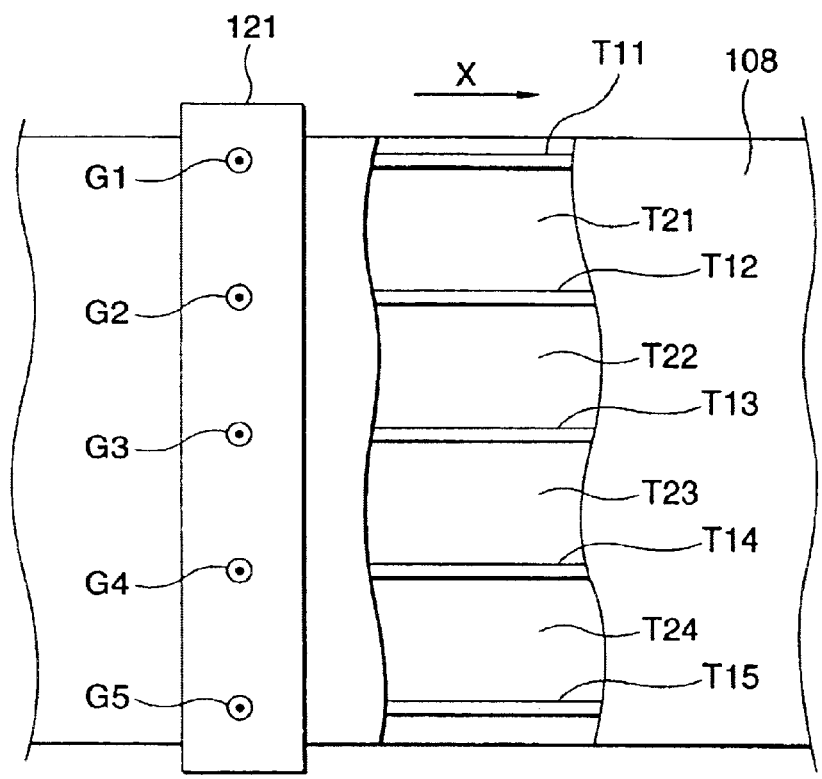
FIG. 12 is an explanatory diagram a construction of a magnetic tape to which servo patterns are written.
Figure 13:
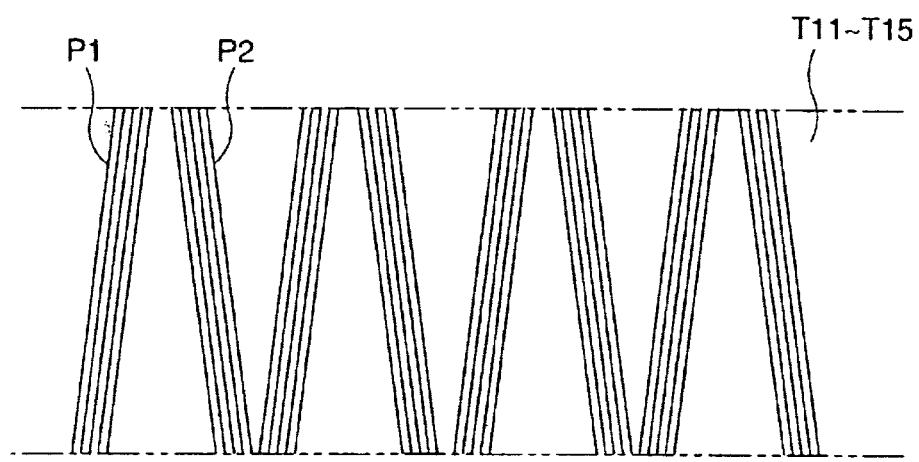
FIG. 13 is an explanatory diagram showing servo patterns to be written into the servo tracks on the magnetic tape shown in FIG. 12.

A tape reel 131 of the embodiment is used for a magnetic tape cartridge of the one-reel type. The tape reel includes a cylindrical reel hub 133 on which a magnetic tape 108 is wound, and a couple of upper and lower flanges 135 and 136 which are provided in the form of collars at the upper and lower ends of the reel hub 133 and position both side edges of the magnetic tape 108 wound on the reel hub 133, thereby preventing the magnetic tape 108 from being moved in the tape width direction. As shown in FIG. 12, the magnetic tape 108 to be wound on the reel hub 133 contains servo tracks T11 to T15 for storing servo patterns and data tracks T21 to T24 for storing data, which are alternately arranged in the width direction of the magnetic tape.

The flange 135, as shown in FIGS. 6 and 7, is integrally coupled to the upper end of the reel hub 133. The lower flange 156 and the reel hub 133 are joined together in a manner that a lib 136a protruded from the inner peripheral edge thereof is welded, by ultrasonic wave welding, to a step 133a formed along the peripheral edge of the lower end of the reel hub 133.

The inventor of the present patent application experimentally examined the form of the magnetic tape 108 wound on the tape reel 131 and the running stability of the magnetic tape 108, and analyzed the experimental examination. From the experimental analysis, the inventor found the fact that the tape speed is affected by a thickness of the tape and the like, but more affected by the width dimension WT of the magnetic tape and the dimension WF between the pair of flanges 135 and 136.

As the dimension WF between the pair of flanges 135 and 136 is increased relative to the width dimension WT of the magnetic tape, a contact resistance of the tape edges of the magnetic tape 108 to the pair of flanges 135 and 136 during the tape running decreases. There is less chance that the tape edges come in contact with the flanges to cause the tape running to be disturbed. On the other hand, the capability of positioning the tape edges by the flanges 135 and 136 decreases and its decrease is actualized. With increase of the positional variation of the tape edges, the form of the winding of the magnetic tape 108 is deteriorated in beauty. As a result, the product value is degraded in light of beauty.

The characteristic of the dimension WF between the paired flanges 135 and 136 was examined in detail. To this end, various combinations of the values of the dimension WF between the flanges 135 and 136 were examined on two points, 1) to reduce the contact resistance of the tape edges to the flanges 135 and 136 and 2) to maintain a good form of the winding of the magnetic tape 108. On the basis of the examination results, the dimension WF between the flanges 135 and 136 is selected so as to satisfy the following requirements: 1) the operations of writing and reading of the servo patterns to and from the servo tracks of the magnetic tape 108 are not hindered by the disturbance of the running of the magnetic tape 108 when the tape edges of said magnetic tape come in contact with said flanges 135 ad 136 and; and 2) positional variations of the tape edges of the magnetic tape 108 wound on the reel hub 133 fall within a tolerable range, thereby maintaining a good form of the winding of the magnetic tape 108.

The examination results showed the following facts: In the case of the tape reel 131 for a magnetic tape cartridge of the one-reel type, 1) for the dimension WF between the flanges 135 and 136, the inside diameter of the flange 135, 136 is larger than the width dimension WT of the magnetic tape 108 by about 0.1 mm to 0.35 mm, and the outside diameter of the flange 135, 126 is larger than the width dimension WT of the magnetic tape 108 by 0.2 mm to 0.55 mm; and 2) As also shown in FIG. 8, the inner surface of one of the flanges (in the embodiment, the inner surface 135a of the upper flange 135) is tapered so that the dimension WF between the flanges 135 and 136 gradually increases from the inside diameter side of the flange to the outside diameter side.

A preferable material of each flange 135, 136 is polycarbonate resin containing glass fibers, which is excellent in mechanical strength and heat resistance.

In the tape reel 131 thus designed, the distance between the flanges 135 and 136 of the tape reel 131 is selected to be within a range where the form of the magnetic tape 108 wound on the tape reel 131 is good, and the contact resistance of the tape edges to the flanges 135 and 136 of the tape reel 131 is selected to be within a range where the tape running is not disturbed. Therefore, the form of the magnetic tape 108 wound on the tape reel 131 is kept good, and the external appearance of the magnetic tape cartridge in which the magnetic tape 108 is wound on the tape reel 131 is good, and in this sense the product valid is increased.

There is no chance that the contact resistance of the tape edges to the flanges 135, 136 of the tape reel 131 during the tape running and the tape running is not disturbed. In writing and reading the servo patterns to and from the magnetic tape 108 wound on the tape reel 131, the trouble by the tape running disturbance does not occur. The improvement of the performance of writing and reading the servo patterns to and from the magnetic tape 108 is realized at low cost in the magnetic tape writer for the magnetic tape 108.

The dimension WF between the flanges 135 and 136 is selected to have a proper value, which is larger than that of the width dimension WT of the magnetic tape 108. The inner surface 135a of at least one of the flanges, i.e., the flange 135, is tapered such that the dimension WF between the flanges 135 and 136 increases toward the outside diameter of the flange. Even if the peripheral speed of the flanges 135 and 136 varies with a variation of the diameter of the winding of the magnetic tape 108 on the tape reel 131, the contact resistance of the tape edges to the flanges 135 and 136 less varies. Accordingly, the tape running disturbance caused by the increase of the contact resistance of the tape edges to the tape reel 131 during the tape running is more reliably prevented.

The servo patterns are written to the magnetic tape 108 within the magnetic tape cartridge before its delivery. In order to maintain good running stability of the tape, it is preferable that the dimension between the paired flanges 135 and 136 of the tape reel 131 remains not varied for a long time, from the product delivery. If a material making one of the flanges 135 and 136 is different from that making the other, the following problem arises. The flanges 135 and 136 will be expanded and deformed by a temperature variation during the transportation for the product delivery and a temperature cycle in its long time use. In this case, the expansion and deformation of one of the flanges are different from those of the other. As a result, the dimension between the flanges 135 and 136 of the tape reel 131 loses its proper dimensional value.

If each flange 135, 136 is made of polycarbonate resin containing glass fibers, which is excellent in mechanical strength and heat resistance, it does not happen that the flanges 135 and 136 of the tape reel 131 are deformed by a temperature variation during the transportation for the product delivery and a temperature cycle in its long time use. Further, the proper dimensional value of the dimension between the flanges 135 and 136 as originally set may be maintained for a long time, from the product delivery. Accordingly, the running stability of the magnetic tape 108 and the form of the winding of the magnetic tape 108 can be kept satisfactory and good for a long time.

In the above-mentioned embodiment, the inner surface of the flange 135 is tapered such that the dimension WF between the flanges 135 and 136 increases toward the outside diameter of the flange. If required, the inner surface of the other flange may be tapered in like manner.

Of course, the flange of the tape reel as above-mentioned embodiment may be applied to the magnetic tape cassette as shown in the first aspect of the invention. In such a combined structure, the magnetic tape cassette having a high commercial value can be produced and achieve the main object of the present invention.

In the tape reel in use for a magnetic tape cartridge, a distance between a pair of flanges of a tape reel is selected to be within a range that the form of the magnetic tape 108 wound on the tape reel is kept good, and that the contact resistance of the tape edges to the flanges of the tape reel during the tape running is not in excess of such a value as to disturb the tape running.

Accordingly, the form of the winding of the magnetic tape on the tape reel is kept good, and the external appearance of the magnetic tape cartridge in which the magnetic tape is wound on the tape reel is improved. In this sense, the product value is increased. Further, the tape running is not disturbed by the increase of the contact resistance of the tape edges to the flanges of the tape reel during the tape running. The writing and reading of the servo patterns to and from the magnetic tape wound on the tape reel is not hindered by the tape running disturbance. The improvement of the performance of writing and reading the servo patterns to and from the magnetic tape is realized at low cost in the magnetic tape writer or the like.

According to a third aspect, the preferred embodiment of the present invention will be described with reference to the accompanying drawings. In the description to follow, like or equivalent portions are designated by like reference numerals used in the description already given, for simplicity.

Figure 14:
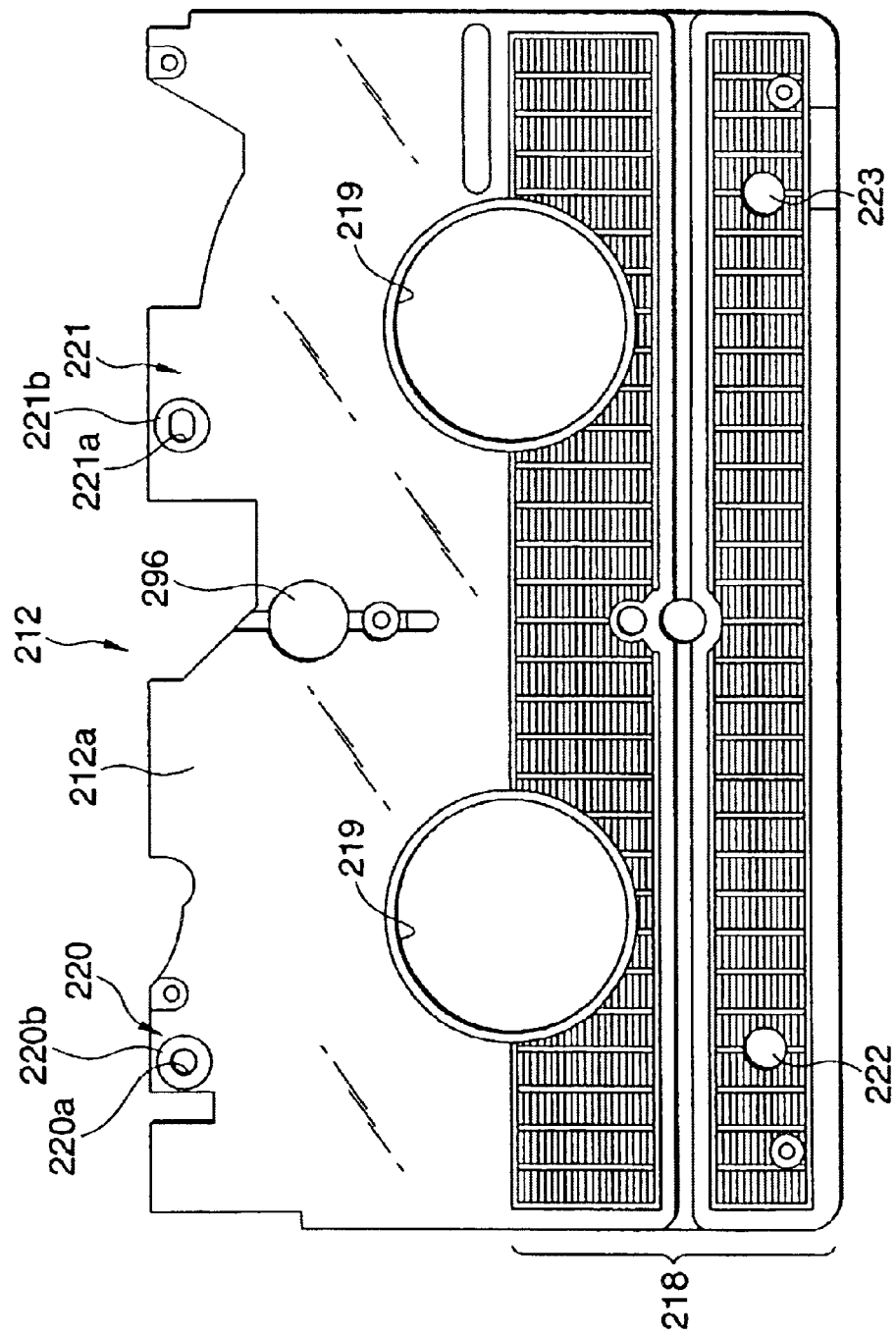
FIG. 14 is a plan view showing a lower cassette half of an embodiment based on a third aspect of the present invention.

FIG. 14 is a plan view showing a lower cassette half 212 for a magnetic tape cassette (for the VHS cassette), which is an embodiment of the present invention. The lower cassette half 212 is made of translucent resin.

A pair of insertion holes 219 into which reel drive shafts of the hard drive are to be inserted are formed in a flat plate 212a of the lower cassette half 212. A light source insertion hole 296 is provided in the front end (which is confronted with the write head when it is loaded into the hard drive) of the central portion of the flat plate 212a as longitudinally viewed. Regions 218 consisting of vertically and horizontally extended grooves (lines) are provided on the rear end of the flat plate 212a. The external appearance and touch of those regions are different from those of other regions.

Reference positioning means 220 and 221 each having a hole are provided at two locations longitudinally spaced from each other on the front end of the flat plate 212a of the lower cassette half 212. A hole 220a of the reference positioning means 220 is circular as viewed from top, and a hole 221a of the other reference positioning means 221 is elongated as viewed from top. A reference positioning face 220b (221b) is formed on and along the opening edge of the hole 220a (221a). The reference positioning face 220b (221b) is formed of resin that is different from the resin of the remaining part of the lower cassette half 212, and increased in strength, and smoothed.

Flat reference positioning means 222 and 223 are provided at two locations longitudinally spaced from each other on the rear end of the flat plate 212a of the lower cassette half 212. The reference positioning means 222 (223) is also formed of resin that is different from the resin of the remaining part of the lower cassette half 212, and is increased in strength and smoothed, and serves as a reference positioning face. Both the reference positioning means 222 and 223 are located within the regions 218 having grooves, but no grooves are formed in the reference positioning faces.

In the lower cassette half 212, reference positioning portions 220 to 223 are formed in and on the flat plate 212a by two-color molding. The flat plate 212a is translucent, and the reference positioning portions 220 to 223 are colored black.

When the magnetic tape cassette using the lower cassette half 212 is set in the hard drive, the two positioning pins of the hard drive are respectively inserted into holes 220a and 221a of the reference positioning means 220 and 221, and the shoulder parts of the positioning pins are respectively brought into contact with the reference positioning faces 220b and 221b.

In the thus magnetic tape cassette using the lower cassette half 212, the cassette case is not damaged when the reference positioning means 220 to 223 are brought into contact with the positioning members (positioning pins and the like), although the cassette case is formed translucent. Further, the magnetic tape cassette can be manufactured at low cost.

It should be understood that the present invention is not limited to the embodiment mentioned above, but may variously be modified, altered and changed within the true spirits of the invention.

The reference positioning means may be formed translucent if such a strength as not to damage the cassette case is secured.

If required, other predetermined locations than the lower half cassette may be increased in strength.

The present invention may be applied to other magnetic tape cassettes than the VHS video cassette. Examples of those other cassettes are DVC and DAT.

Of course, the reference positioning means maybe applied to the magnetic tape cassette of the first aspect of the present invention.

As seen from the foregoing description, in the thus magnetic tape cassette using the lower cassette half, the cassette case is not damaged when the reference positioning means are brought into contact with the positioning members, and the magnetic tape cassette can be manufactured at low cost. Further, if the cassette case is formed translucent, no problems arise.

According to a fourth aspect, the preferred embodiment of the present invention will be described with reference to the accompanying drawings. In the description to follow, like or equivalent portions are designated by like reference numerals used in the description already given, for simplicity.

Figure 16B:
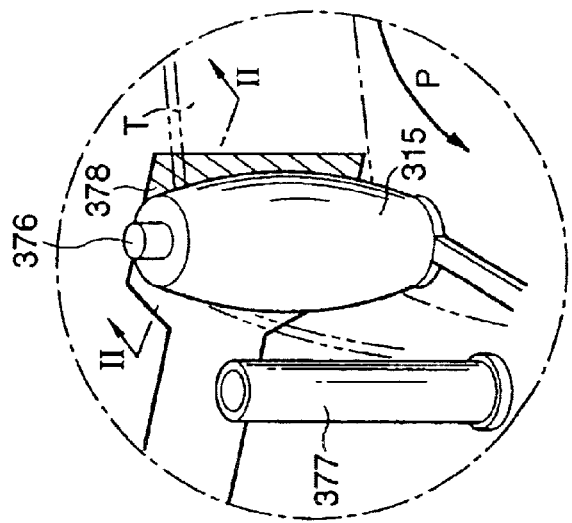
FIGS. 16A and 16B are perspective views showing a key portion of an embodiment based on a fourth aspect of the invention.
Figure 16A:
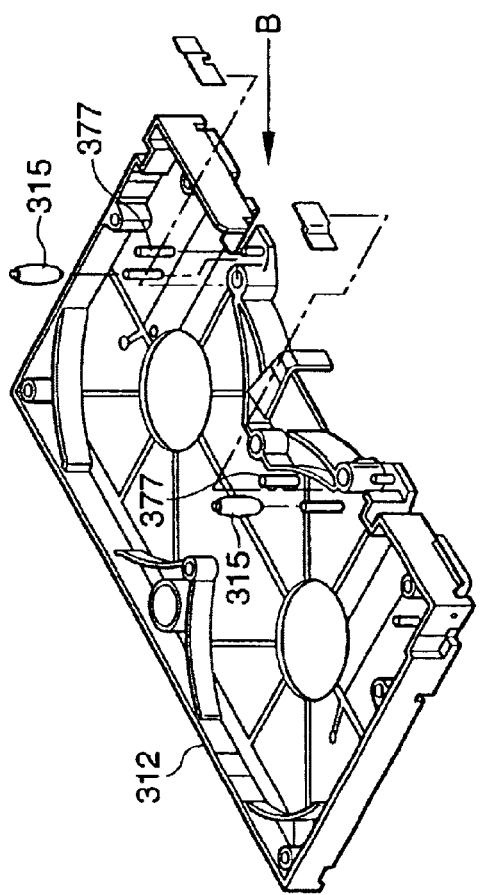
Figure 18:
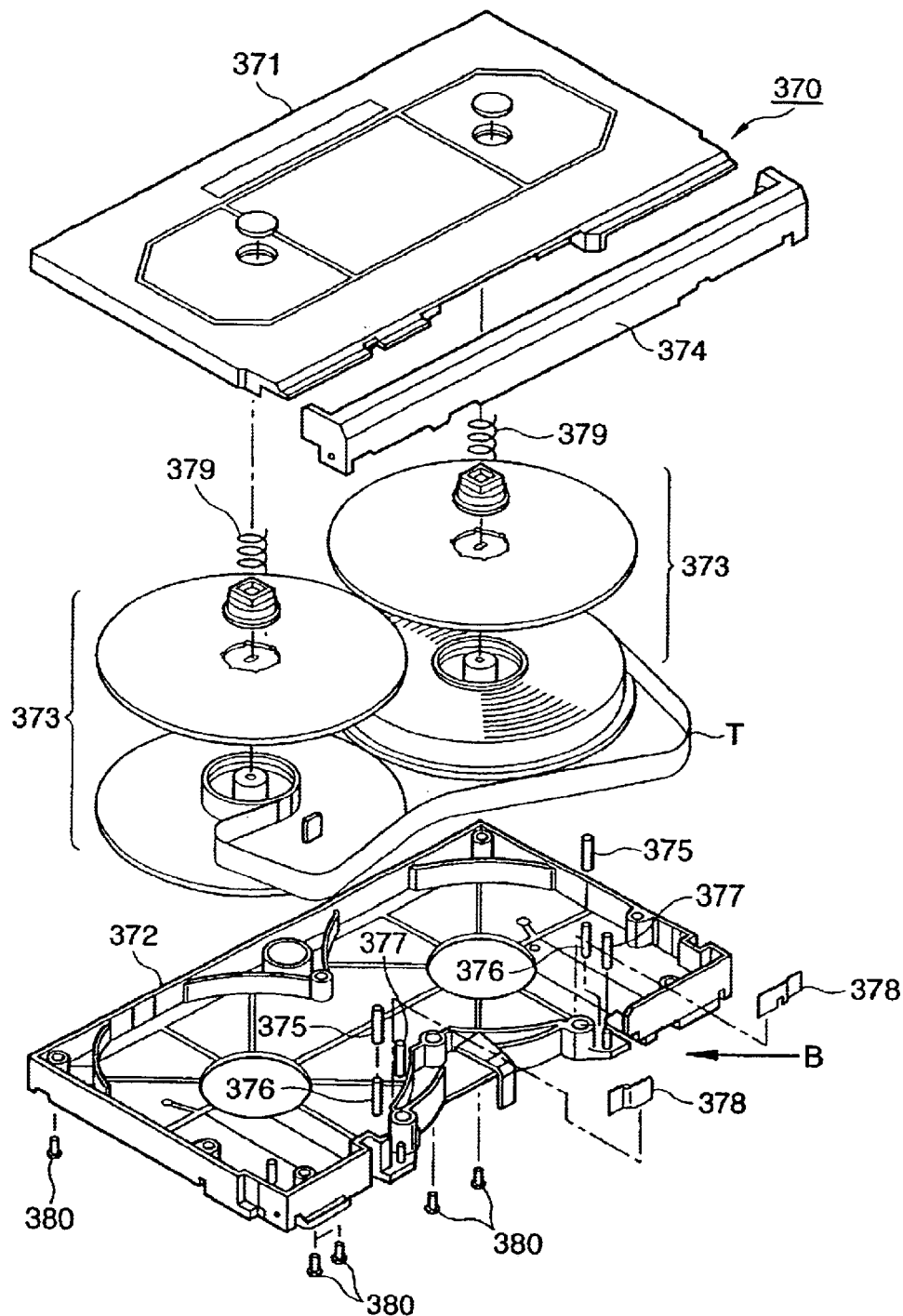
FIG. 18 is an exploded view showing a conventional magnetic tape cassette.
Figure 19:
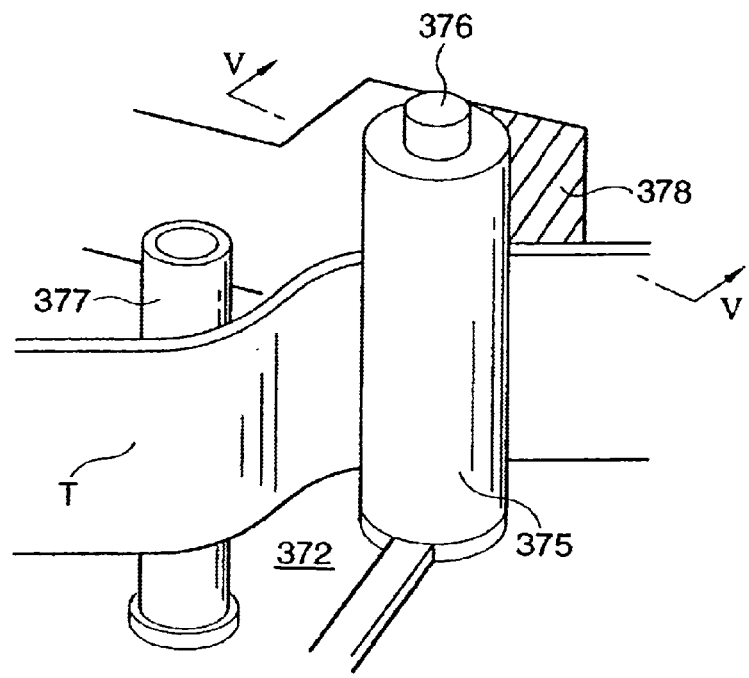
FIG. 19 is an enlarged view of the magnetic tape cassette when viewed in the direction of an arrow B as shown in FIG. 18.
Figure 20:
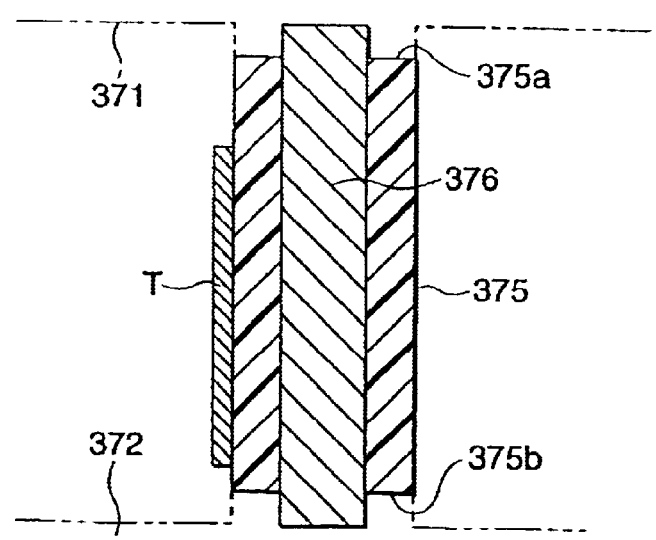
FIG. 20 is a cross sectional view taken on line V—V in FIG. 19.

FIG. 16A is a perspective view showing a lower cassette half 312 in a magnetic tape cassette (Beta cam L cassette) which is an embodiment of the present invention. FIG. 16B is an enlarged view showing a structure in which a guide roller 315 and a guide pin 377 are mounted on the lower cassette half 312, the illustration being viewed in the direction of an arrow B in FIG. 16A. The tape reel and the upper half cassette, both not shown, may be those shown in FIG. 18. As shown in FIGS. 16A and 16B, the guide rollers 315 and the guide pins 377 are mounted on both sides of the opening of the front end (is confronted with the recording head of the record/playback device) of the lower cassette half 312.

A state of a structure in which a magnetic tape T is drawn from a tape reel (not shown) in the direction of an arrow P, and is taken out of the cassette case via the guide roller 315, is shown in FIG. 16B. The magnetic tape T urged by the pad 378 runs on the outer surface of the guide roller 315, passes between the guide roller 315 and the guide pin 377, is taken out of the cassette case, and put on the magnetic head of the record/playback device (not shown).

Figure 17:
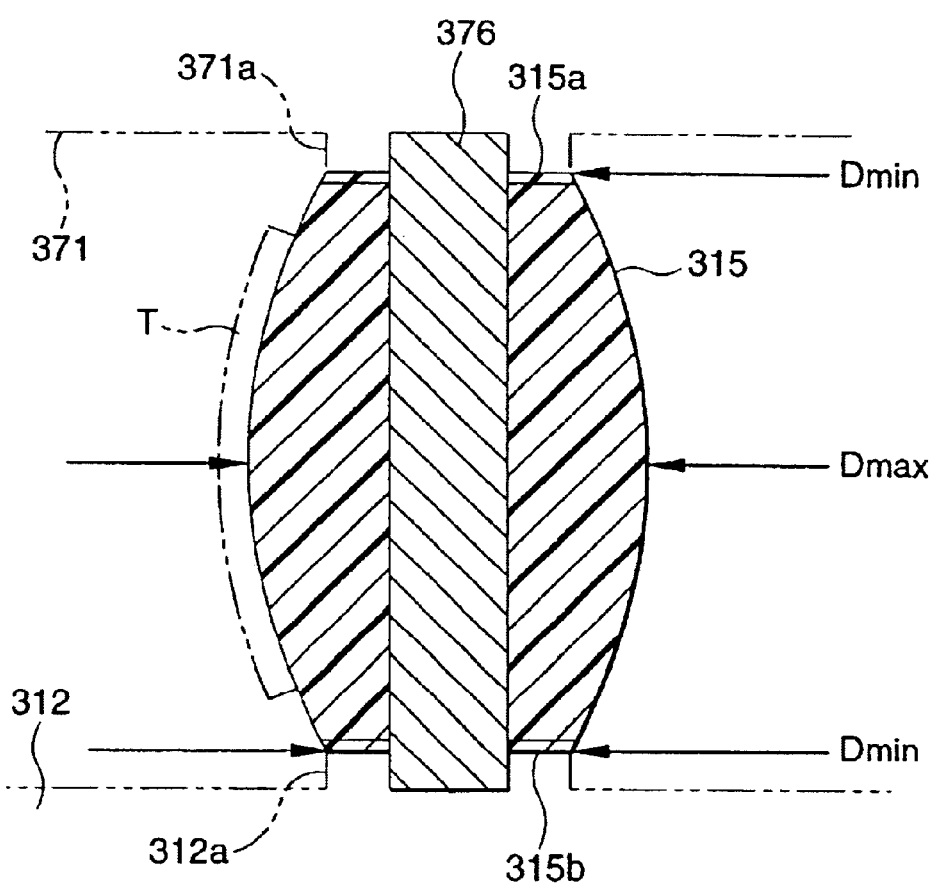
FIG. 17 is a cross sectional view taken on line II—II in FIG. 16.

FIG. 17 is a cross sectional view taken on line II—II in FIG. 16B. As shown in FIG. 17, the guide roller 315 is shaped like a barrel, viz., its outer surface is curved such that the outside diameter of the guide roller 315 gradually decreases from the center to both ends as viewed in the axial direction. The guide roller 315 is symmetrical with respect to the center thereof as viewed in the axial direction such that the largest diameter Dmax of it is at the center as viewed in the axial direction and the smallest outside diameter Dmin of it is at both ends.

The guide roller 315 gives the magnetic tape T a tension, so that its rotation well follows up the tape running. Accordingly, when the magnetic tape T runs, it is hard to slide on the outer surface of the guide roller 315. Accordingly, the guide roller 315 well rotates with the running of the magnetic tape T.

The upper end face 315a and the lower end face 315b of the guide roller 315 are subjected to surface treatment, whereby those surfaces are hard to be cut. Specifically, the upper end face 315a and the lower end face 315b are smoothed. To this end, an ironing process is used. The guide roller 315 is made of polyoxymethylene (POM). The flat plates of the upper cassette half 371 and the lower cassette half 312 include protruded support parts 371a and 312a for supporting the guide roller 315 at the flat faces of their tops. The upper end face 315a of the guide roller 315 is supported by the protruded support part 371a of the upper cassette half 371. The lower end face 315b is supported by the protruded support part 312a of the lower cassette half 312.

A procedure of the ironing process for ironing the guide roller 315 will be described. Two heating plates which have been heated to a temperature within a temperature range, which is lower than a melting point of the resin (POM), are prepared. The guide roller 315 is sandwiched between those heating plates. Specifically, one of the heating plates is brought into contact with the upper end face (one of the faces) 315a, and the other heating plate is brought into contact with the other end face (the other face) of the guide roller 315. The thus processed upper and lower end faces 315a and 315b are glossier than the remaining part of the guide roller 315.

The upper and lower end faces 315a and 315b of the guide roller 315, which have ironed, are smoothed, viz., the surface irregularity, cut, blur and the like are removed. Accordingly, those faces are resistive to abrasion.

In the magnetic tape cassette thus constructed, less abrasion occurs at contact portions at which the upper and lower end faces 315a and 315b of the guide roller 315 are in contact with the upper and lower cassette halves 371 and 312. Specifically, the upper and lower end faces 315a and 315b of the guide roller 315 are ironed to be smoothed. As a result, the upper and lower end faces 315a and 315b and the upper and lower cassette halves which are in contact with the former are resistive to abrasion.

Therefore, an amount of cut powder, which is produced at contact portions at which the upper and lower end faces 315a and 315b of the guide roller 315 are in contact with the upper and lower cassette halves 371 and 312, is markedly reduced.

It should be understood that the present invention is not limited to the above-mentioned embodiment, but may variously be modified, altered and changed within the true spirits of the invention.

While the barrel shaped guide roller is used in the embodiment, the guide roller may be cylindrical in shape, viz., uniform in diameter. Only one of the upper and lower end faces of the guide roller may be subjected to the surface treatment.

It is evident that the present invention may be applied to other various types of magnetic tape cassettes than the Beta cam L cassette.

For example, the guide roller as the above-mentioned embodiment may be applied to the magnetic tape cassette as shown in the other aspects.

As seen from the foregoing description, the magnetic tape cassette of the invention markedly reduces an amount of cut powder, which is produced at contact portions at which the upper and lower end faces of the guide roller are in contact with the upper and lower cassette halves.

According to a fifth aspect, the preferred embodiment of the present invention will be described with reference to the accompanying drawings. In the description to follow, like or equivalent portions are designated by like reference numerals used in the description already given, for simplicity.

Figure 21:
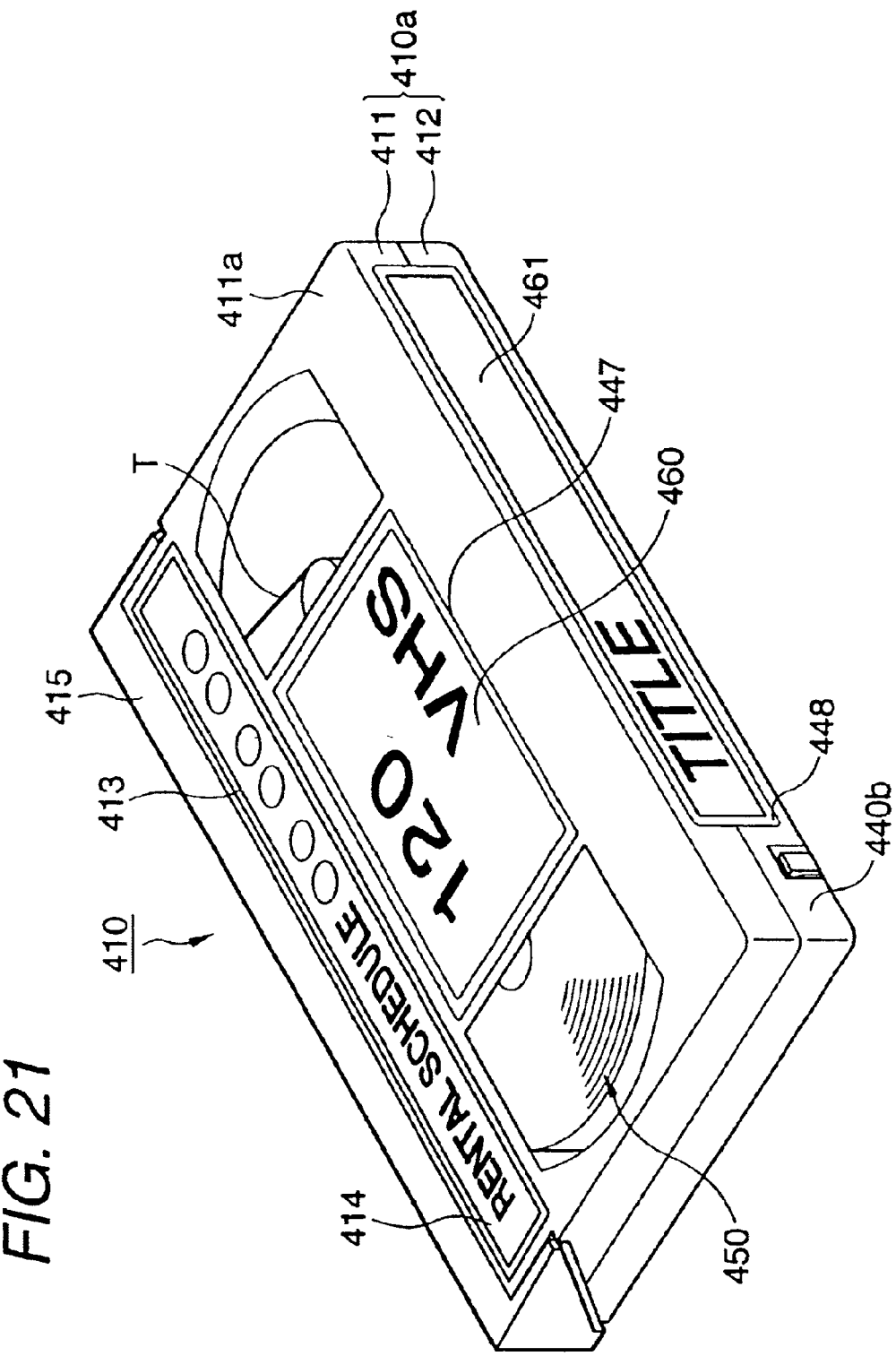
FIG. 21 is a perspective view showing a magnetic tape cassette which is an embodiment based on a fifth aspect of the present invention.
Figure 22:
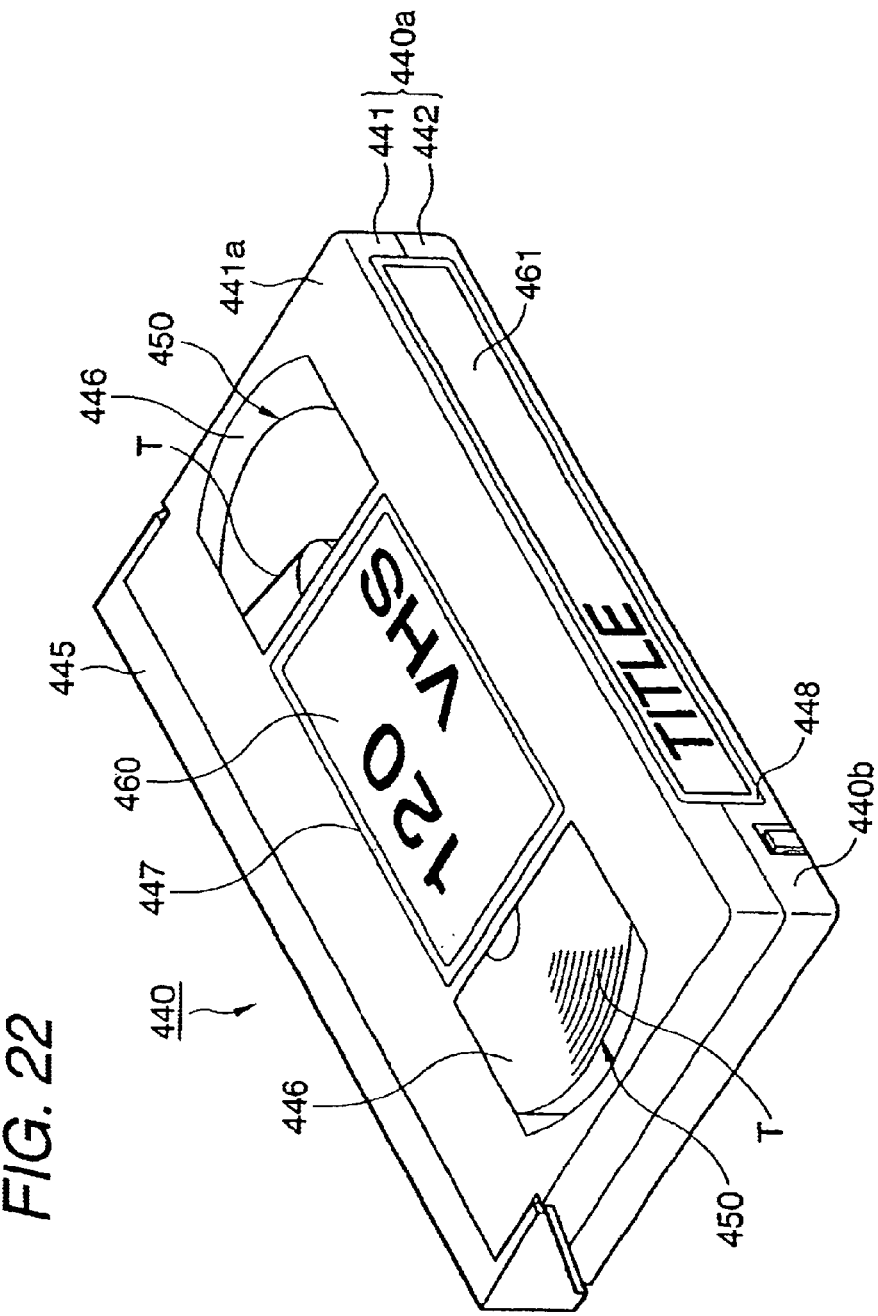
FIG. 22 is a perspective view showing a conventional magnetic tape cassette.

FIG. 21 is a perspective view showing a magnetic tape cassette 410 which is an embodiment of the present invention.

An external appearance of the magnetic tape cassette 410 is substantially defined by an upper cassette half 411 and a lower cassette half 412, and a guard panel 415 as a cover member.

A pair of tape reels 450 on which a magnetic tape T is wound are rotatably disposed within a cassette case 410a formed by combining the upper cassette half 411 and the lower cassette half 412. The guard panel 415 is attached to the front end of the cassette case in a hinged manner.

Label areas 447 and 448 are located on a flat plate 411a of the upper cassette half 411 and the rear side wall 410b of the cassette case 410a. Labels 460 and 461 describing the recording information on the magnetic tape cassette are pasted on the label areas 447 and 448. An information presenting section 413 is provided in the flat plate 411a (upper part in the drawing) at a location between the label area 447 and the guard panel 415. A label 414 which contains information different from the recording information on the magnetic tape cassette is pasted on the information presenting section 413. The label 414 contains a description of a title of a rental video which will be lent out in near future, as the information different from the recording information on the magnetic tape cassette.

The magnetic tape cassette 410 is able to display, for example, the title of a rental video which will be lent out in near future, which the title is not presented in the conventional label areas 447 and 448.

The contents stored or the like are customarily described in the label areas 447 and 448. The user is also accustomed to such a visual presentation. Accordingly, if movie information not related to the recorded contents is presented in the label areas 447 and 448, the user will be confused.

The embodiment eliminates such a user's confusion.

Further, if the label 414 is replaced with a new label containing update rental information, update rental information is presented to users all the time.

It should be understood that the invention is not limited to the above-mentioned embodiment, but may variously be modified, altered and changed with the true spirits of the invention.

In the embodiment mentioned above, the rental information is used for the information different from the recording information on the magnetic tape cassette.

If required, an advertisement not related to the recorded contents may be presented in the information presenting section. If advertisement on a supermarket located in the video shop is presented in the information presenting section of the magnetic tape cassette, which is frequency lent out to housewives in the video shop, the magnetic tape cassette lent out may be used as an effective advertising medium.

In the above-mentioned embodiment, the label containing the information different from the recording information on the magnetic tape cassette is pasted on the appearance defining member. If required, the same information may be formed on the appearance defining member by printing, transferring, engraving, molding or the like.

According to the main object of the present invention, it is effective that the information presenting section of this embodiment is applied to the magnetic tape cassette as shown in the other aspects.

As seen from the foregoing description, if the magnetic tape cassette of the invention is used, various information may be carried on the magnetic tape cassette in a manner that information different from the recording information on the magnetic tape cassette is visually presented on the appearance defining member or members.

What is claimed is:

1. A method for surface treating a guide roller rotatably supported in a case of a magnetic tape cassette comprising:

performing an ironing treatment on at least one of an upper end face and a lower end face of the guide roller so that at least one of the upper end face and the lower end face is not worn through its contact with the case of the magnetic tape cassette, wherein the ironing treatment is executed in such a manner that two heating plates having mirror surfaces are contacted to the upper end face of the guide roller and the lower end face of the guide roller, respectively.

2. A method for surface treating a guide roller according to claim 1, wherein the ironing treatment is executed in such a state that the ironing treatment temperature is lower than a melting point of resin.

3. A method for surface treating a guide roller according to claim 2, wherein the guide roller is made of polyoxymethylene (POM).

4. A method for surface treating a guide roller according to claim 1, wherein the guide roller is made of polyoxymethylene (POM).

* * * * *